(12) United States Patent
Diamant et al.

(10) Patent No.: US 12,400,106 B1
(45) Date of Patent: Aug. 26, 2025

(54) ARITHMETIC-INTENSITY BASED LOAD CLONING

(71) Applicant: Amazon Technologies, Inc., Seattle, WA (US)

(72) Inventors: Ron Diamant, San Jose, CA (US); Robert Geva, Cupertino, CA (US); Jindrich Zejda, Saratoga, CA (US); Tiandong Zhao, Cupertino, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1016 days.

(21) Appl. No.: 17/304,341

(22) Filed: Jun. 18, 2021

(51) Int. Cl.
 *G06F 9/46* (2006.01)
 *G06F 9/30* (2018.01)
 *G06N 3/063* (2023.01)

(52) U.S. Cl.
 CPC ......... *G06N 3/063* (2013.01); *G06F 9/30043* (2013.01)

(58) Field of Classification Search
 CPC ............................ G06N 3/063; G06F 9/30043
 See application file for complete search history.

(56) References Cited

U.S. PATENT DOCUMENTS

| | | | |
|---|---|---|---|
| 2019/0147337 A1* | 5/2019 | Yang ...................... | G06N 3/063 706/25 |
| 2020/0175374 A1* | 6/2020 | Hestness ................. | G06N 3/084 |
| 2022/0083847 A1* | 3/2022 | Yoon ......................... | G06N 3/04 |

* cited by examiner

*Primary Examiner* — Tammy E Lee
(74) *Attorney, Agent, or Firm* — Weaver Austin Villeneuve & Sampson LLP

(57) ABSTRACT

A computer-implemented method includes receiving a neural network model that includes memory load operations and a plurality of computation operations, selecting a memory load operation having an arithmetic intensity factor (AIF) greater than a threshold value from the memory load operations, grouping computation operations associated with data loaded by the selected memory load operation into two or more clusters of computation operations, and incorporating an instance of the selected memory load operation before each cluster of the two or more clusters of computation operations in the neural network model.

19 Claims, 14 Drawing Sheets

ARITHMETIC-INTENSITY BASED LOAD CLONING

BACKGROUND

Artificial neural networks are computing systems with an architecture based on biological neural networks. Artificial neural networks can be trained using training data to learn how to perform a certain task, such as natural language processing, and identifying or classifying physical objects, activities, characters, etc., from images or videos. An artificial neural network may include multiple layers of processing nodes. Each processing node on a layer can perform computations on input data generated by processing nodes on the preceding layer to generate output data. For example, a processing node may perform a set of arithmetic operations such as multiplications and additions to generate an intermediate output, or perform operations on the intermediate output. The size of the data used in each layer, such as the dimensions of input data for each input channel, the number of input channels, the number of weights to be applied to the input data, and the like, may vary from layer to layer. Thus, the number of arithmetic operations (e.g., matrix multiplications) and the sizes of the data used for the operations performed on each layer may vary from layer to layer.

BRIEF DESCRIPTION OF THE DRAWINGS

Various embodiments in accordance with the present disclosure will be described with reference to the drawings, in which.

DETAILED DESCRIPTION

Figure 1:
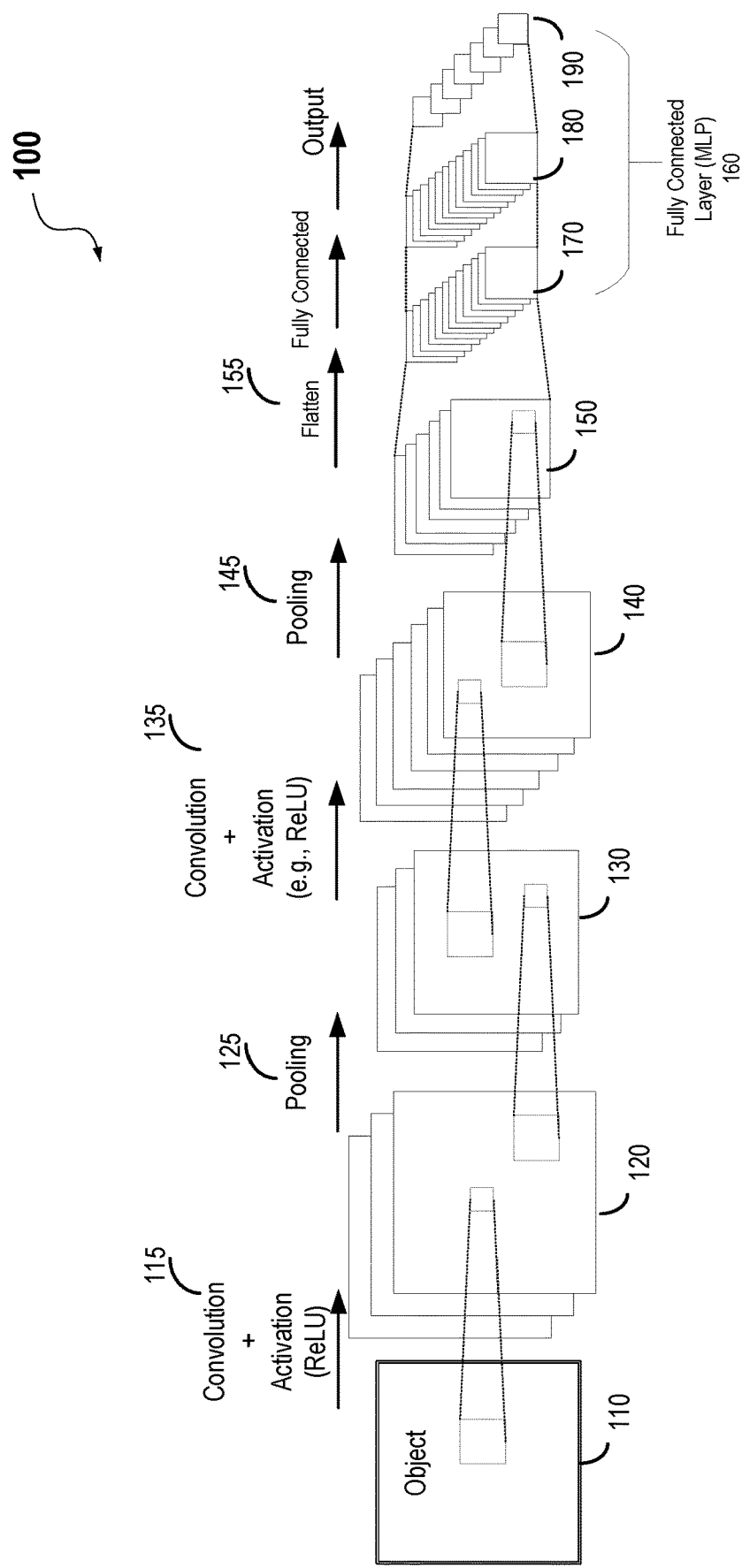
FIG. 1 illustrates an example of a convolutional neural network (CNN)

Techniques disclosed herein relate generally to artificial neural networks. More specifically, disclosed herein are techniques for compiling a neural network model and allocating local memory of a neural network processor (e.g., an accelerator or another processing engine) based on the neural network model, to more efficiently utilize available computing power, local memory, and memory bandwidth of the neural network processor, thereby improving the overall performance of the neural network processor and other execution engines for implementing the neural network model.

An artificial neural network may generally include multiple processing nodes arranged on two or more layers, where processing nodes on one layer may connect to processing nodes on another layer. Each processing node on a layer may receive a stream of input data elements, multiply each input data element with a weight, compute a weighted sum of the input data elements, and forward the weighted sum to the next layer. The size of the data used in each layer, such as the dimensions of input data for each channel, the number of channels, the number of weights (e.g., filters) to be applied to the input data, the dimension of each filter, and the like, may vary from layer to layer. For example, in many neural networks, as the network gets deeper, the number of channels may increase, while the size of each channel may reduce. Thus, the number of arithmetic operations (e.g., matrix multiplications) performed and the sizes of the data used for the arithmetic operations at each layer may vary from layer to layer. For example, the number of input channels in the first layer of a residual neural network (ResNet), such as a ResNet-50 network, may be three, but the number of channels may be much higher in a deeper layer.

The underlying hardware for implementing a neural network, such as a computing system including a graphic processing unit (GPU), a processing element array, or another processing engine, may generally have a certain number of processing elements (e.g., pre-configured numbers of columns and/or rows), and a local memory having a finite size and a maximum data read/write bandwidth. For example, the local memory of a neural network processor generally has a small size (e.g., a few megabytes), and thus may not have capacity to hold all tensors for the computations (including input data to be processed and filters) at the same time. The local memory of the neural network processor also has a finite data transfer bandwidth, and thus may take time to load a tensor from an external memory device (e.g., a DRAM on another chip or circuit board). Thus, tensors (including static variables such as filters) used by the neural network processor may need to be appropriately allocated to and removed from the local memory during the execution of the neural network model, such that tensors used for a computation operation by the neural network processor may be available at the local memory with a zero to a minimum latency, in order to fully utilize resources (e.g., the computing power) of the neural network processor to achieve a high performance (e.g., high throughput or short processing time).

The memory allocation may be determined by a compiler that generates and schedules instructions to be executed by the neural network processor and other execution engines (e.g., direct memory access (DMA) engines) of a computing system to implement a neural network model. The instructions may generally include instructions for memory load operations that read input data (e.g., input feature maps) and static variables (e.g., weights, such as filter tensors for a convolutional neural network), and instructions for computation operations that use the input data and the static variables to perform arithmetic operations. Some static variables, when loaded into the local memory (e.g., a state buffer), may be used by many computation operations. In many cases, the computation operations that use the same static variables may be farther apart from each other in the neural network model (e.g., a dataflow graph), where other computation operations using other static variables may be between these computation operations that use the same static variables. Thus, the static variables allocated into the local memory may have a long lifetime and may occupy the local memory for a long time. Static variables used by other computation operations may also need to be loaded into the local memory that may have a finite size. The local memory may also need to store input data and intermediate computation results. Therefore, the local memory may not be large enough to store all these data.

As such, in many cases, it may be desirable to reduce the lifetime of loaded static variables such that the local memory can be freed to store new variables and data for other operations. This can be achieved by loading the variables from an external memory into the local memory each time the variables are used by a computation operation or a series of computation operations. However, this technique may significantly increase the usage of the memory bandwidth, and may increase the latency and reduce the computation throughput because the execution engines may need to wait while the load operation is executed. Thus, it may be desirable to determine where load operations may be added into the neural network model to improve the overall performance of the computing system using the available local memory and memory bandwidth of the computing system.

According to certain embodiments, a neural network model compiler may use local arithmetic intensity factors associated with load operations to distinguish between compute-bound portions of the graph that have high arithmetic intensities (where inserting additional load operations may not reduce the performance of the computing system) and memory-bound portions of the graph that have low arithmetic intensities (where the performance may be limited by the performance of the memory subsystem and thus inserting additional load operations may make the bandwidth limited computation even more so). The neural network compiler may organize computation operations that use the same static variables (e.g., weights) into one or more groups (or clusters) using various clustering techniques, based on, for example, arithmetic intensity factors associated with computation operations using the same static variables, and distances between the computation operations (e.g., number of other operations between two computation operations). An instance of the load operation may be added in front of each group (or cluster) of computation operations, rather than before each computation operation.

As such, a group (or cluster) of computation operations that use the same static variables loaded by a load operation can be close to the load operation to reduce the lifetime of the loaded static variables, thereby reducing the usage of the finite-sized local memory of the processing engine by the loaded static variables. In addition, because the operations may be compute-bound, adding load operations may not degrade the performance of the processing engine. Static variables loaded by a load operation may be used by multiple computation operations, rather than a single computation operation. Thus, the total number of load operations, the use of the memory bandwidth, and the latency may be reduced. As such, the throughput or the processing time of the neural network processor may be improved. The load cloning by the pre-scheduler may facilitate the allocation of tensors into the local memory by an allocator.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

Artificial neural networks (also referred to as "neural networks") have been used in machine learning research and industrial applications and have achieved many breakthrough results in, for example, image recognition, speech recognition, computer vision, natural language processing, and the like. An artificial neural network may include multiple processing nodes arranged on two or more layers, where processing nodes on one layer may connect to processing nodes on another layer. The processing nodes can be divided into layers including, for example, an input layer, a number of intermediate layers (also known as hidden layers), and an output layer. Each processing node on a layer (e.g., an input layer, an intermediate layer, etc.) may receive a sequential stream of input data elements, multiply each input data element with a weight, compute a weighted sum of the input data elements, and forward the weighted sum to the next layer. An artificial neural network, such as a convolutional neural network, may include thousands or more of processing nodes and millions or more of weights and input data elements.

A Convolutional neural network (ConvNet or CNN) may perform operations including, for example, (1) convolution; (2) non-linearity (or activation) function (e.g., ReLU); (3) pooling or sub-sampling; and (4) classification. Different CNNs may have different combinations of these four main operations, as well as other additional operations. For example, a ResNet-50 network may include network layers that include mostly convolution layers and a few pooling layers, and may also perform residue-add operations for residue learning.

FIG. 1 illustrates an example of a convolutional neural network (CNN) 100 for image or other object classifications. CNN 100 may perform four types of operations including convolution, non-linearity (or activation) function (e.g., ReLU), pooling or sub-sampling, and classification (fully-connected layer). An object 110 to be classified, such as one or more input images or other input datasets (referred to as input feature maps), may be represented by a matrix of pixel values. For example, object 110 may include multiple channels (e.g., multiple input feature maps), each channel representing a certain component of object 110. For example, an image from a digital camera may have at least a red channel, a green channel, and a blue channel, where each channel may be represented by a 2-D matrix of pixels having pixel values in the range of, for example, 0 to 255 (i.e., 8-bit). A gray-scale image may have only one channel. In the following description, the processing of a single image channel using CNN 100 is described. Other channels may be processed similarly.

As shown in FIG. 1, object 110 (e.g., input images) may first be processed by a first convolution layer 115 using a first set of filters, where first convolution layer 115 may perform a convolution between a matrix representing the input image and a matrix representing each filter in the first set of filters. The convolution may include multiple matrix multiplication. First convolution layer 115 may also perform a non-linear activation function (e.g., ReLU). An output matrix 120 from first convolution layer 115 may have smaller dimensions than the input image. First convolution layer 115 may perform convolutions on the input image using the first set of filters to generate multiple output matrices 120, which may be referred to as output feature maps of first convolution layer 115. The number of filters used may be referred to as the depth of the convolution layer. In the example shown in FIG. 1, first convolution layer 115 may have a depth of three. Each output matrix 120 (e.g., an output feature map) may be passed to a pooling layer 125, where each output matrix 120 may be subsampled or downsampled to generate a matrix 130.

Each matrix 130 may be processed by a second convolution layer 135 using a second set of filters. A non-linear activation function (e.g., ReLU) may also be performed by the second convolution layer 135 as described above. An output matrix 140 (e.g., an output feature map) from second convolution layer 135 may have smaller dimensions than matrix 130. Second convolution layer 135 may perform convolutions on matrix 130 using the second set of filters to generate multiple output matrices 140. In the example shown in FIG. 1, second convolution layer 135 may have a depth of six. Each output matrix 140 may be passed to a pooling layer 145, where each output matrix 140 may be subsampled or down-sampled to generate an output matrix 150.

The output matrices 150 from pooling layer 145 may be flattened to vectors by a flatten layer 155, and passed through a fully-connected layer 160 (e.g., a multi-layer perceptron (MLP)). Fully-connected layer 160 may include an input layer 170 that takes the 1-D output vector from flatten layer 155. Fully-connected layer 160 may also include a hidden layer and an output layer 190. Fully-connected layer 160 may classify the object in the input image into one of several categories using feature maps or output matrix 150 and, for example, a Softmax function. The operation of the fully-connected layer may be represented by matrix multiplications. For example, if there are M nodes on input layer 170 and N nodes on hidden layer 180, and the weights of the connections between the M nodes on input layer 170 and the N nodes on hidden layer 180 can be represented by a matrix W that includes M×N elements, the output Y of hidden layer 180 may be determined by Y=X× W.

The convolution operations in a CNN may be used to extract features from the input image. The convolution operations may preserve the spatial relationship between pixels by extracting image features using small regions of the input image. In a convolution, a matrix (referred to as a filter, a kernel, or a feature detector) may slide over the input image (or a feature map) at a certain step size (referred to as the stride). For every position (or step), element-wise multiplications between the filter matrix and the overlapped matrix in the input image may be calculated and summed to generate a final value that represents a single element of an output matrix (e.g., a feature map). A filter may act to detect certain features from the original input image.

The convolution using one filter (or one filter set) over an input pixel array may be used to produce one feature map, and the convolution using another filter (or another filter set) over the same input pixel array may generate a different feature map. In practice, a CNN may learn the weights of the filters on its own during the training process based on some user specified parameters (which may be referred to as hyperparameters), such as the number of filters, the filter size, the architecture of the network, etc. The higher number of filters used, the more image features may get extracted, and the better the network may be at recognizing patterns in new images.

The sizes of the output feature maps may be determined based on parameters, such as the depth, stride, and zero-padding. As described above, the depth may correspond to the number of filters (or sets of filters) used for the convolution operation. For example, in CNN 100 shown in FIG. 1, three distinct filters are used in first convolution layer 115 to perform convolution operations on the input image, thus producing three different output matrices 120 (or feature maps). Stride is the number of pixels by which the filter matrix is slid over the input pixel array. For example, when the stride is one, the filter matrix is moved by one pixel at a time. When the stride is two, the filter matrix is moved by two pixels at a time. Having a larger stride may produce smaller feature maps. In some implementations, the input matrix may be padded with zeros around the border so that the filter matrix may be applied to bordering elements of the input pixel array. Zero-padding may allow control of the size of the feature maps.

As shown in FIG. 1, an additional non-linear operation using an activation function (e.g., ReLU) may be used after every convolution operation. ReLU is an element-wise operation that replaces all negative pixel values in the feature map by zero. The purpose of the ReLU operation is to introduce non-linearity in the CNN. Other non-linear functions described above, such as tanh or sigmoid function, can also be used, but ReLU has been found to perform better in many situations.

Spatial pooling (also referred to as subsampling or down-sampling) may reduce the dimensions of each feature map, while retaining the most important information. In particular, pooling may make the feature dimensions smaller and more manageable, and reduce the number of parameters and computations in the network. Spatial pooling may be performed in different ways, such as max pooling, average pooling, sum pooling, etc. In max pooling, the largest element in each spatial neighborhood (e.g., a 2×2 window) may be used to represent the spatial neighborhood. Instead of taking the largest element, the average (for average pooling) or sum (for sum pooling) of all elements in each window may be used to represent the spatial neighborhood. In many applications, max pooling may work better than other pooling techniques.

In the example shown in FIG. 1, two sets of convolution and pooling layers are used. It is noted that these operations can be repeated any number of times in a single CNN. In addition, a pooling layer may not be used after every convolution layer. For example, in some implementations, a CNN may perform multiple convolution and ReLU operations before performing a pooling operation.

The training process of a convolutional neural network, such as CNN 100, may be similar to the training process for any feedforward neural network. First, all parameters and weights (including the weights in the filters and weights for the fully-connected layer) may be initialized with random values (or the parameters of a known neural network). Second, the convolutional neural network may take a training sample (e.g., a training image) as input, perform the forward propagation steps (including convolution, non-linear activation, and pooling operations, along with the forward propagation operations in the fully-connected layer), and determine the output probability for each possible class. Since the parameters of the convolutional neural network, such as the weights, are randomly assigned for the training example, the output probabilities may also be random.

At the end of the training process, all weights and parameters of the CNN may have been optimized to correctly classify the training samples from the training dataset.

When an unseen sample (e.g., a test sample or a new sample) is input into the CNN, the CNN may go through the forward propagation step and output a probability for each class using the trained weights and parameters, which may be referred to as an inference (or prediction) process as compared to the training process. If the training dataset is sufficient, the trained network may classify the unseen sample into a correct class.

Figure 2:
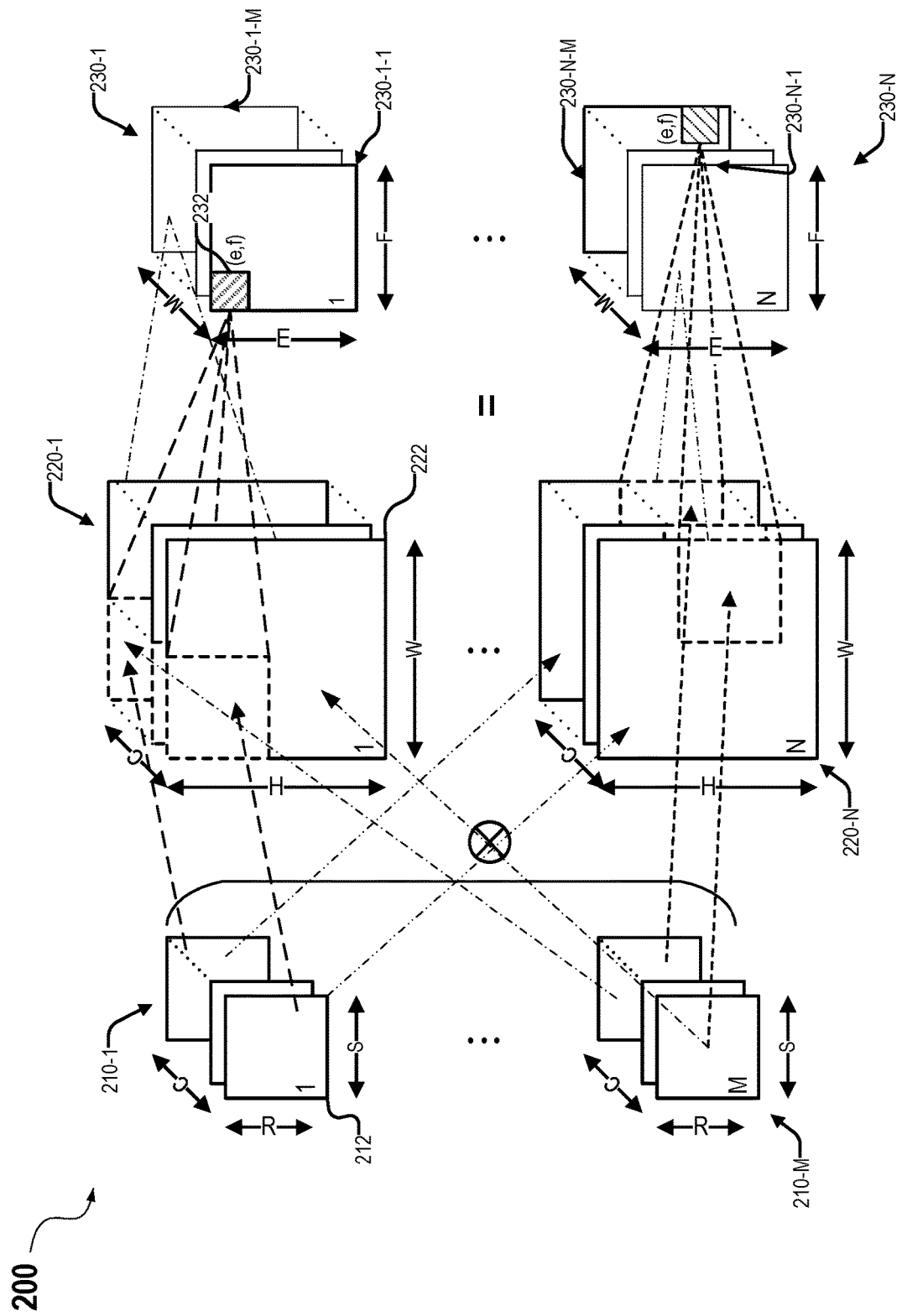
FIG. 2 illustrates an example of a model for a convolution layer of a convolutional neural network.

FIG. 2 illustrates an example of a model 200 for a convolution layer of a convolutional neural network used in, for example, image processing. As illustrated in the example, there may be multiple (e.g., N) 3-D inputs 220-1, . . . , and 220-N to the convolution layer. Each 3-D input may include C channels of 2-D input feature maps (with dimensions H×W). For the first convolution layer in a CNN, such as a ResNet-50, a 3-D input may include, for example, three channels of 2-D images, such as the red, green, and blue color channels. Multiple (e.g., M) 3-D filters 210-1, . . . , and 210-M, each having C 2-D filters of dimensions R×S, may be convolved with the N 3-D inputs 220-1, . . . , and 220-N (e.g., N batches of C input feature maps of dimensions H×W) to generate multiple (e.g., N) 3-D outputs 230-1, . . . , and 230-N, where each of the 3-D outputs 230-1, . . . , and 230-N may include M output feature maps (also referred to as output channels). Each 3-D filter 210-1, . . . , or 210-M (with dimensions C×R×S) may be applied to a 3-D input 220-1, . . . , or 220-N (with dimensions C×H×W) to generate an output feature map (with dimensions E×F as described above with respect to FIGS. 3A and 3B) in a 3-D output 230-1, . . . , or 230-N that includes M output feature maps, and thus M 3-D filters may be used to generate the M output feature maps in a 3-D output 230-1, . . . , or 230-N for a 3-D input 220-1, . . . , or 220-N. For example, 3-D filter 210-1 may be applied to 3-D input 220-1 to generate an output feature map 230-1-1, . . . and 3-D filter 210-M may be applied to 3-D input 220-1 to generate an output feature map 230-1-M. The same M 3-D filters 210-1, . . . , and 210-M can be applied to each 3-D input 220-1, . . . , or 220-N to generate each respective 3-D output 230-1, . . . , or 230-N that includes M output feature maps. For example, 3-D filter 210-1 may be applied to 3-D input 220-N to generate an output feature map 230-N-1, and 3-D filter 210-M may be applied to 3-D input 220-N to generate an output feature map 230-N-M. Thus, there are N 3-D inputs and N 3-D outputs, where each 3-D output includes M output feature maps.

More specifically, as shown in FIG. 2, for a 3-D input 220-1, . . . , or 220-N and a 3-D filter 210-1, . . . , or 210-M, the C 2-D filters (each with dimensions R×S) in a 3-D filter 210-$m$ may correspond to the C channels of 2-D input feature maps (each with dimensions H×W) in the 3-D input, and the convolution operation between each 2-D filter of the C 2-D filters and the corresponding channel of the C channels of 2-D input feature maps may be performed. The convolution results for C pairs of 2-D filter and corresponding 2-D input feature map can be summed to generate a convolution output (e.g., a pixel) $O_{e,f}^{m}$ on an output feature map of index m in the M output feature maps in a 3-D output 230-1, . . . , or 230-N as follows:

$$O_{e,f}^{m} = \sum_{r=0}^{R-1}\sum_{s=0}^{S-1}\sum_{c=0}^{C-1} X_{eD+r,fD+s}^{c} \times W_{r,s}^{c,m}, \quad (1)$$

where m corresponds to the index of the output feature map and the index of the 3-D filter in the M 3-D filters.

$X_{eD+r,fD+s}^{c}$ is the value of a pixel with a horizontal pixel coordinate of eD+r and a vertical pixel coordinate of fD+s in an input feature map of index C in the C channels of 2-D input feature maps in a 3-D input. D is the sliding-window stride distance. e and f are the coordinates of the output pixel in the corresponding output feature map of the M output feature maps and may correspond to a particular sliding window. r and s correspond to a particular location (e.g., pixel or element) within a sliding window or a 2-D filter. $W_{r,s}^{c,m}$ is a weight corresponding to a pixel at a location (r, s) of a 2-D filter of index C in the 3-D filter of index m. Equation (1) indicates that, to compute each convolution output (e.g., pixel) $O_{e,f}^{m}$ at a location (e, f) on an output feature map m, each pixel $X_{eD+r,fD+s}^{c}$ within a sliding window in an input feature map of index C may be multiplied with a corresponding weight $W_{r,s}^{c,m}$ to generate a product, the partial sum of the products for the pixels within each sliding window in the input feature map of index C can be computed, and then a sum of the partial sums for all C input feature maps can be computed to determine the value of the pixel $O_{e,f}^{m}$ at a location (e, f) in the corresponding output feature map of index m in the M output feature maps.

In one example, for 3-D filter 210-1 and 3-D input 220-1, each 2-D filter 212 in the C 2-D filters in 3-D filter 210-1 may correspond to a respective input feature map 222 in 3-D input 220-1 and may be used to convolve with (e.g., filter) the corresponding input feature map 222, where each pixel in a sliding window 224 in input feature map 222 may be multiplied with a corresponding pixel in 2-D filter 212 to generate a product, and the products for all pixels in sliding window 224 may be summed to generate a partial sum. The partial sums for the C 2-D filters 212 (and corresponding input feature map 222) may be added together to generate an output pixel 232 at a location (e, f) on output feature map 230-1-1 in 3-D output 230-1. Sliding window 224 may be shifted on all C input feature maps 222 in 3-D input 220-1 based on the strides D in the two dimensions to generate another output pixel 232 at a different location on output feature map 230-1-1 in 3-D output 230-1. Sliding window 224 may be repeatedly shifted together on all C input feature maps 222 until all output pixels 232 on output feature map 230-1-1 in 3-D output 230-1 are generated.

Each 3-D filter 210-2, . . . , or 210-M may be used to convolve with 3-D input 220-1 as described above with respect to 3-D filter 210-1 to generate each respective output feature map 230-1-2, . . . , or 230-1-M in 3-D output 230-1. Similarly, each 3-D filter 210-1, . . . , or 210-M may be used to convolve with 3-D input 220-N as described above with respect to 3-D filter 210-1 and 3-D input 220-1 to generate each respective output feature map 230-N-1, . . . , or 230-N-M in 3-D output 230-N.

Operation of a neural network (e.g., conducting inference), as illustrated by the examples discussed above, generally involves fetching input data (or input activations) and filter data (e.g., weights), executing multiply-and-accumulate (MAC) operations on the input data and the filter data in parallel for each node in a layer, and providing output activations. Optimum performance of a neural network, for example, measured by response time, can be achieved when a hardware architecture is capable of highly parallelized computations. Special-purpose or domain-specific neural network processors can achieve better performance than both CPUs and GPUs when executing a neural network. Neural network processors can employ a spatial architecture including a processing element (PE) array, in which the processing elements may form processing chains and can pass data directly from one processing element to another.

This can significantly reduce the number of memory transactions. In some examples, the weights or inputs can be pre-loaded into the processing element array. In some examples, neural network processors can also include an on-chip buffer (referred to as a local memory or a state buffer) that can store values read from external memory (e.g., a DRAM), and that can distribute values to multiple computing engines in the processor. The computing engines can further include a small, local register file (e.g., a small memory) for storing intermediate results. Having an on-chip memory hierarchy can improve the efficiency of the operation of a neural network by reducing memory latencies.

Figure 3:
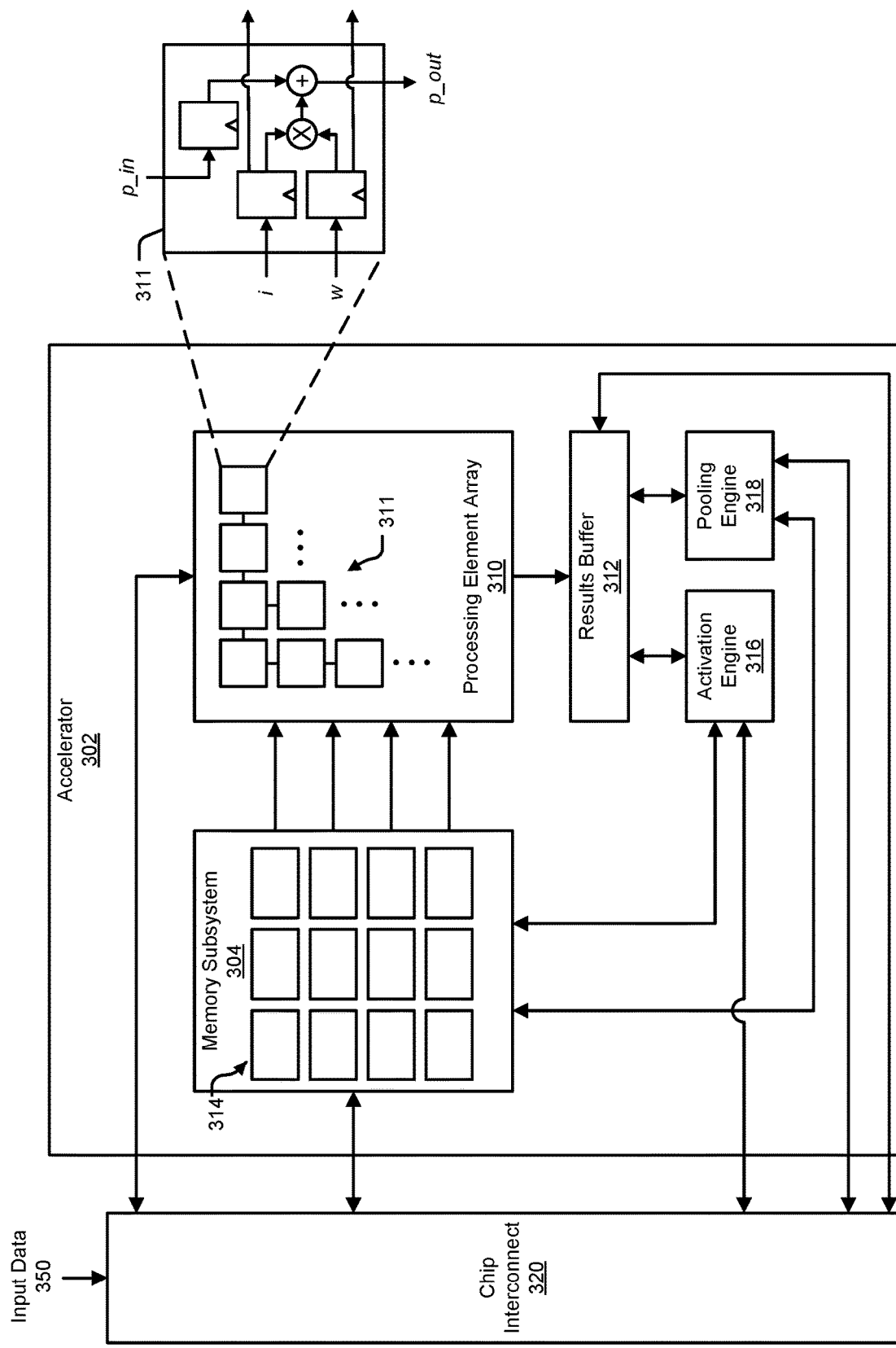
FIG. 3 is a simplified block diagram illustrating an example of an integrated circuit device for performing neural network operations according to certain embodiments.

FIG. 3 is a block diagram illustrating an example of an integrated circuit device for performing neural network operations, such as tensor operations, according to certain embodiments. The example shown in FIG. 3 includes an accelerator 302. In various examples, accelerator 302 can execute computations for a set of input data (e.g., input data 350) using a processing element array 310, an activation engine 316, and/or a pooling engine 318. In some examples, accelerator 302 may be an integrated circuit component of a processor, such as a neural network processor. The processor may have other integrated circuit components, including additional accelerator engines.

In some embodiments, accelerator 302 may include a memory subsystem 304 (e.g., a state buffer) that includes multiple memory banks 314. Each memory bank 314 can be independently accessible, such that the read of one memory bank is not dependent on the read of another memory bank. Similarly, writing to one memory bank may not affect or limit writing to a different memory bank. In some cases, each memory bank can be read and written at the same time. Various techniques can be used to have independently accessible memory banks 314. For example, each memory bank can be a physically separate memory component that has an address space that is separate and independent of the address spaces of each other memory bank. In this example, each memory bank may have at least one read channel and may have at least one separate write channel that can be used at the same time. In these examples, the memory subsystem 304 can permit simultaneous access to the read or write channels of multiple memory banks. As another example, the memory subsystem 304 can include arbitration logic such that arbitration between, for example, the outputs of multiple memory banks 314 can result in more than one memory bank's output being used. In these and other examples, though globally managed by the memory subsystem 304, each memory bank can be operated independently of any other.

Having the memory banks 314 independently accessible can increase the efficiency of accelerator 302. For example, values can be simultaneously read and provided to each row of processing element array 310, so that the entire processing element array 310 can be in use in one clock cycle. As another example, memory banks 314 can be read at the same time that results computed by processing element array 310 are written to memory subsystem 304. In contrast, a single memory may be able to service only one read or write at a time. With a single memory, multiple clock cycles can be required, for example, to read input data for each row of processing element array 310 before processing element array 310 can be started.

In various implementations, memory subsystem 304 can be configured to simultaneously service multiple clients, including processing element array 310, activation engine 316, pooling engine 318, and any external clients that access memory subsystem 304 over a communication fabric 320. In some implementations, being able to service multiple clients can mean that memory subsystem 304 has at least as many memory banks as there are clients. In some cases, each row of processing element array 310 can count as a separate client. In some cases, each column of processing element array 310 can output a result, such that each column can count as a separate write client. In some cases, output from processing element array 310 can be written into memory banks 314 that can then subsequently provide input data for processing element array 310. As another example, activation engine 316 and pooling engine 318 can include multiple execution channels, each of which can be separate memory clients. Memory banks 314 can be implemented, for example, using static random access memory (SRAM).

In various implementations, memory subsystem 304 can include control logic. The control logic can, for example, keep track of the address spaces of each of memory banks 314, identify memory banks 314 to read from or write to, and/or move data between memory banks 314. In some implementations, memory banks 314 can be hardwired to particular clients. For example, a set of memory banks 314 can be hardwired to provide values to the rows of processing element array 310, with one memory bank servicing each row. As another example, a set of memory banks can be hard wired to receive values from columns of processing element array 310, with one memory bank receiving data for each column.

Processing element array 310 is the computation matrix of accelerator 302. Processing element array 310 can, for example, execute parallel integration, convolution, correlation, and/or matrix multiplication, among other things. Processing element array 310 may include multiple processing elements 311, arranged in rows and columns, such that results output by one processing element 311 can be input directly into another processing element 311. Processing elements 311 that are not on the outside edges of processing element array 310 thus can receive data to operate on from other processing elements 311, rather than from memory subsystem 304.

In various examples, processing element array 310 uses systolic execution, in which data arrives at each processing element 311 from different directions at regular intervals. In some examples, input data can flow into processing element array 310 from the left and weight values can be loaded at the top. In some examples weights and input data can flow from the left and partial sums can flow from top to bottom. In these and other examples, a multiply-and-accumulate operation moves through processing element array 310 as a diagonal wave front, with data moving to the right and down across the array. Control signals can be input at the left at the same time as weights, and can flow across and down along with the computation.

In various implementations, the numbers of columns and rows in processing element array 310 may determine the computational capacity of processing element array 310. For example, the number of rows in processing element array 310 may determine the number of input feature maps that can be processed in parallel, and the number of columns in processing element array 310 may determine the number of filter sets that can be applied in parallel to input data. The number of rows in processing element array 310 may also determine the memory bandwidth for achieving the maximum utilization of processing element array 310. Processing element array 310 can have, for example, 64 columns and 128 rows, or some other number of columns and rows.

An example of a processing element 311 is illustrated in an inset diagram in FIG. 3. As illustrated by this example, processing element 311 can include a multiplier-accumulator circuit. Inputs from the left can include, for example, input data i and a weight value w, where the input data is a value taken from either a set of input data or a set of intermediate results, and the weight value is from a set of weight values that connect one layer of the neural network to the next. A set of input data can be, for example, an image being submitted for identification or object recognition, an audio clip being provided for speech recognition, a string of text for natural language processing or machine translation, or the current state of a game requiring analysis to determine a next move, among other things. In some examples, the input data and the weight value are output to the right, for input to the next processing element 311.

In the illustrated example, an input from above can include a partial sum, p_in, provided either from another processing element 311 or from a previous round of computation by processing element array 310. When starting a computation for a new set of input data, the top row of processing element array 310 can receive a fixed value for p_in, such as zero. As illustrated by this example, i and w are multiplied together and the result is summed with p_in to produce a new partial sum, p_out, which can be input into another processing element 311. Various other implementations of processing element 311 are possible.

Outputs from the last row in processing element array 310 can be temporarily stored in a results buffer 312 (e.g., partial sum (PSUM) buffer). The results can be intermediate results, which can be written to memory banks 314 to be provided to processing element array 310 for additional computation. Alternatively, the results can be final results, which, once written to memory banks 314 can be read from memory subsystem 304 over communication fabric 320, to be output by the system.

In some implementations, accelerator 302 includes an activation engine 316. In these implementations, activation engine 316 can combine the results from processing element array 310 into one or more output activations. For example, for a convolutional neural network, convolutions from multiple channels can be summed to produce an output activation for a single channel. In other examples, accumulating results from one or more columns in processing element array 310 may be needed to produce an output activation for a single node in the neural network. In some examples, activation engine 316 can be bypassed.

In various examples, activation engine 316 can include multiple separate execution channels. In these examples, the execution channels can correspond to the columns of processing element array 310, and can perform an operation on the outputs of a column, the result of which can be stored in memory subsystem 304. In these examples, activation engine 316 may be able to perform between 1 and N parallel computations, where N is equal to the number of columns in processing element array 310. In some cases, one or more of the computations can be performed simultaneously. Examples of computations that each execution channel can perform include exponentials, squares, square roots, identities, binary steps, bipolar steps, sigmoidals, and ramps, among other examples.

In some implementations, accelerator 302 can include a pooling engine 318. Pooling is the combining of outputs of the columns of processing element array 310. Combining can include for example, computing a maximum value, a minimum value, an average value, a median value, a summation, a multiplication, or another logical or mathematical combination. In various examples, pooling engine 318 can include multiple execution channels that can operating on values from corresponding columns of processing element array 310. In these examples, pooling engine 318 may be able to perform between 1 and N parallel computations, where N is equal to the number of columns in processing element array 310. In various examples, execution channels of pooling engine 318 can operate in parallel and/or simultaneously. In some examples, pooling engine 318 can be bypassed.

Herein, activation engine 316 and pooling engine 318 may be referred to collectively as execution engines. Processing element array 310 is another example of an execution engine. Another example of an execution engine is a Direct Memory Access (DMA) engine, which may be located outside accelerator 302.

Input data 350 can arrive over communication fabric 320. Communication fabric 320 can connect accelerator 302 to other components of a processor, such as a DMA engine that can obtain input data 350 from an Input/Output (I/O) device, a storage drive, or a network interface. Input data 350 can be, for example one-dimensional data, such as a character string or numerical sequence, or two-dimensional data, such as an array of pixel values for an image or frequency and amplitude values over time for an audio signal. In some examples, input data 350 can be three-dimensional, as may be the case with, for example, the situational information used by a self-driving car or virtual reality data. In some implementations, memory subsystem 304 can include a separate buffer for input data 350. In some implementations, input data 350 can be stored in memory banks 314 when accelerator 302 receives input data 350.

In some examples, accelerator 302 can implement a neural network processing engine. In these examples, accelerator 302, for a set of input data 350, can execute a neural network to perform a task for which the neural network was trained. Executing a neural network on a set of input data can be referred to as inference or performing inference.

The weights for the neural network can be stored in memory subsystem 304, along with input data 350 on which the neural network will operate. The neural network can also include instructions, which can program processing element array 310 to perform various computations on the weights and the input data. The instructions can also be stored in memory subsystem 304, in memory banks 314, or in a separate instruction buffer. Processing element array 310 can output intermediate results, which represent the outputs of individual layers of the neural network. In some cases, activation engine 316 and/or pooling engine 318 may be enabled for computations called for by certain layers of the neural network. Accelerator 302 can store the intermediate results in memory subsystem 304 for inputting into processing element array 310 to compute results for the next layer of the neural network. Processing element array 310 can further output final results from a last layer of the neural network. The final results can be stored in memory subsystem 304 and then be copied out to host processor memory or to another location.

In some embodiments, mapping the tensor operation described above with respect to FIG. 2 and Equation (1) to a PE array (e.g., PE array 310) for execution may include mapping each of the M 3-D filters to a respective column of the PE array, and mapping each input feature map of the C input feature maps (e.g., C channels) in a 3-D input to a respective row of the PE array. For example, the H×W pixels in each 2-D input feature map may be flattened to form a one-dimensional vector and mapped to a row of the PE array. The C×R×S weights or pixels in each 3-D filter may be flattened to form a one-dimensional vector and mapped to a column of the PE array. Partial sums may be accumulated vertically in each column. In cases where a batch including N 3-D inputs each including C channels are processed, each row of the PE array may be mapped to N 2-D input feature maps.

The movement of data, such as input pixels, filter weights, and partial sums to be accumulated, between PEs can reduce the access to the local memory or off-chip memory. In some embodiments, the input feature map can be stationary and the weights of the filters can be shifted, which may be referred to as an "image-stationary" model. In some embodiments, a "weight-stationary" model may be used, where the weights of the filters are stationary (preloaded from a local memory into the registers in the PE array) and the image is moving (loaded from the local memory during computation), in order to minimize the cost of the movement of the weights. In some embodiments, the output of a PE may be stored in the register at the PE and remains stationary to minimize the cost of the movement of the partial sums, where the input feature maps and weights may move through the PE array and the local memory.

Accelerator 302 may perform instructions generated by a compiler using a neural network model, such as a ResNet-50 model. The neural network model may be represented by a data flow graph where each node (e.g., vertex) in the graph may represent an operation, and connections (e.g., edges) between the nodes may represent the data flow or data dependency. The compiler may traverse the data flow graph and perform shape inference on the neural network model, for example, to determine the sizes of the data used for each operation. The compiler may add, to the neural network model, operations for padding the input feature map for each input channel, based on parameters of a convolution operation, such as the size of an original input feature map, the size of a filter (e.g., kernel), the stride used for the convolution, the memory alignment, and the size of the processing element array. Optionally, the compiler may add to the neural network model operations for dividing input data into multiple partitions and dividing the convolution operation into multiple sub-operations. The compiler may map the operations of the neural network model to the computing system, such as memory subsystem 304 and processing element array 310 in accelerator 302, DMA engines, pooling engines 318, activation engines 316, and the like, and generate and schedule instructions to be performed by these different components of the computing system.

Figure 4:
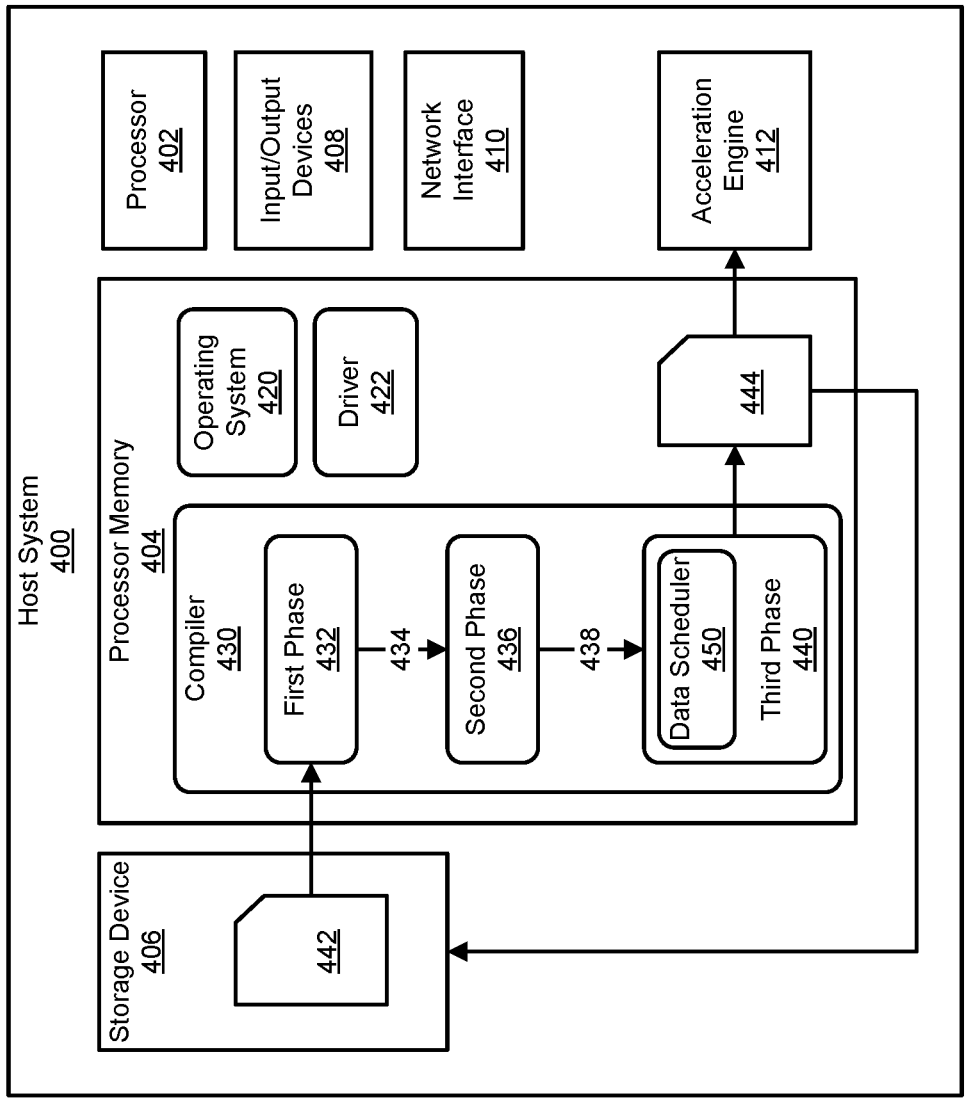
FIG. 4 includes a block diagram of an example of a host system according to certain embodiments.

FIG. 4 includes a block diagram illustrating an example of a host system 400 on which a compiler 430, such as is described herein, can run. The illustrated host system 400 is an example of a computing device, and includes a processor 402, a processor memory 404, at least one storage device 406, various Input/Output (I/O) devices 408, and at least one network interface 410. In the example of FIG. 4, the host system 400 also includes an acceleration engine 412, which is an integrated circuit device that can accelerate certain operations or computations performed by the host system 400. In various examples, the host system 400 can be implemented as a server in a data center, a desktop computer, a laptop computer, a tablet computer, or a smartphone, among other examples. In some examples, operations or components discussed below as being performed or included in the host system 400 can be performed or included in other computer devices. For example, the compiler 430 can execute on the host system 400 while the acceleration engine 412 is located at a different host system.

The processor 402 is an integrated circuit device that can execute program code, in the form of instructions. The program code can be for various software applications or tools, such as an operating system 420 or the illustrated compiler 430. While the processor 402 is executing a program, the instructions for the program can be stored in the processor memory 404. The instructions can also be stored elsewhere, such as on the storage device 406, and can be loaded into the processor memory 404 when needed by the processor 402. The processor 402 can also use the processor memory 404 for temporary storage of other data on which the processor 402 is operating. In various examples, the processor memory 404 is a volatile memory type, such as a type of Random Access Memory, though non-volatile memory types can, alternatively or additionally, be used for the processor memory 404.

The storage device 406 is an example of a device that can include non-volatile memory. For example, the storage device 406 can be a magnetic disk drive, a solid state drive, or an optical drive, among other examples. The storage device 406 can further be non-transitory, such that program code and other data stored on the storage device 406 remains present when the storage device 406 is not powered on.

The storage device 406 is one example of a peripheral device, which are components that can be coupled to the host system 400 to add functionality to the host system 400. Other examples of peripheral devices include the Input/Output devices 408 and the network interface 410. The Input/Output devices 408 can include user input and output devices, such as keyboards, mice, touch screens, microphones, display screens, speakers, printers, and scanners, among other examples. The network interface 410, which can be implemented using a network interface card, can provide access to one or more networks. The network interface 410 can include, for example, a physical port for connecting a network cable and/or wireless antennas for communicating with Wi-Fi and/or cellular networks. The network interface 410 can also be described as an I/O device.

The acceleration engine 412 is also another type of peripheral device or I/O device. The acceleration engine 412 is a device that is purpose-built to perform certain operations that can be performed by the processor 402, but can be performed faster by the acceleration engine 412. For example, the acceleration engine 412 can be a neural network accelerator, and, as such, may be able to perform the large scale, parallel computations of a neural network more efficiently than when the computations are performed by the processor 402. As another example, the acceleration engine 412 can be a graphics processing unit (GPU), and may be optimized to perform the computations needed for graphics rendering. Other examples of devices that can be implemented by the acceleration engine 412 include cryptographic accelerators, compression and decompression accelerators, 3-D accelerators, regular expression accelerators, security accelerators, and others.

In various examples, the acceleration engine 412 can execute program code to perform certain operations. For example, when the acceleration engine 412 is a neural network accelerator, the acceleration engine 412 can be programmed to execute a particular neural network, such as one that performs image recognition or one that performs machine translation. As a further example, to support the execution of a neural network, the acceleration engine 412 can be programed to perform operations such as copying data for the neural network from processor memory 404 (for example) into the acceleration engine 412, copying input data for the neural network from processor memory 404 into the acceleration engine 412, and/or copying results from the acceleration engine 412 into the processor memory 404, among other examples.

To generate program code for the acceleration engine 412, in various examples, the host system 400 can execute the compiler 430. Compilers, in general, are software programs that translate program code written in a human-readable language into a format (e.g., machine instructions) that can be read and processed by an integrated circuit device. In the example of FIG. 4, the acceleration engine 412 is a neural network accelerator and the compiler 430 is for compiling a neural network description into instructions to be executed by the acceleration engine 412. When the acceleration engine 412 implements a different type of accelerator, another compiler can be used.

The compiler 430 can be activated, for example, when the operating system 420 receives keyboard, mouse, touchscreen, voice commands, or other inputs from the Input/Output devices 408. The inputs can further include parameters for the compiler 430, such as the input code 442 to compile and configuration options for the compilation process. Once the compiler 430 is activated, the processor 402 can load the instructions for the compiler 430 into the processor memory 404, and can execute the instructions.

In the example of FIG. 4, the compiler 430 includes a first stage 432, a second stage 436, and a third stage 440, which each perform different operations to produce compiled code 444. In other examples, the compiler 430 can combine the operations of the first stage 432, second stage 436, and/or third stage 440 into fewer stages, or can divide the operations of one of the stages into multiple stages.

The first stage 432 can receive and process input code 442. The input code 442 can describe a program in a high-level programming language, such as Java, C++, or Tensorflow, among many other examples. The input code 442 can describe, for example, steps to perform image recognition, speech recognition, machine translation, or other operations. The input code 442 can be obtained, for example, from the storage device 406. Alternatively, though not illustrated here, the input code 442 may be located in the processor memory 404 or can be obtained from a network location, using the network interface 410. Processing of the input code 442 can include sorting the operations described in the input code 442 into layers, where the outputs of one layer provide the inputs to a next layer. Processing can also include identifying steps to be performed by the processor 402, rather than by the acceleration engine 412. For example, the processor 402, through the execution of a driver 422, may need to perform steps such as configuring Direct Memory Access (DMA) descriptors for moving data into or out of the acceleration engine 412, among other examples.

The output 434 of the first stage 432 can be organized, for example, in the layers, nodes, and connections between nodes of a neural network. The second stage 436 can perform intermediate processing on this output 434. For example, the operations performed in any one layer, or at any one node in a layer, may be too many for the acceleration engine 412 to perform at the same time. The acceleration engine 412 may, for example, have a limited amount of locale storage space for the data needed for a computation, or the computations may be more than the acceleration engine 412 can perform at one time. In this example, the first stage 432 can break the operations of the layer or node down into smaller operations, which can fit into the acceleration engine's local memory and/or can fit into the computing capacity of the acceleration engine 412. Processing of the output 434 of the first stage 432 can include other steps, such as scheduling, or determining the order in which the acceleration engine 412 and/or processor 402 will perform operations, among other examples.

In various examples, the output 438 of the second stage 436 includes the various steps to be performed by components of the acceleration engine 412, in the order that the steps are to be performed. The output 438 can be represented, for example, as a data flow graph, where the nodes in the graph represent memory operations, computations, and other operations, and the edges or connections between the nodes represent dependencies between the nodes, such as data dependencies, memory dependencies, or operational dependencies, among other examples.

The third stage 440 can operate on the output 438 of the second stage 436, and perform various steps before producing the instructions that are to be executed by the acceleration engine 412. These steps can include, for example, removing redundant dependencies, resolving or handling dependencies between nodes by inserting synchronization instructions into the code, identifying possibly optimizations in memory usage or memory bandwidth usage, and other operations. In some examples, the third stage 440 can include a data scheduler 450 to determine the order in which instructions are executed by the acceleration engine 412.

The output of the third stage 440 is compiled code 444, which may include machine instructions in binary format. In some examples, the compiled code 444 can be stored in the processor memory 404. Alternatively or additionally, the compiled code 444 can be copied to the storage device 406 or to a network location. As noted above, the acceleration engine 412 may be located at a different host system, in which case the compiled code 444 can be sent over the network interface 410 to the other host system.

In the example of FIG. 4, the host system 400 can be executing a driver 422, which can also be referred to as a device driver or runtime driver, that manages the acceleration engine 412. The driver 422 can provide an interface between applications executing on the host system 400 (or on another host system) and the acceleration engine 412. For example, the driver 422 can provide an Application Program Interface (API) that defines functions for feeding input data to the acceleration engine 412 and defining the operation to perform on the input data. In this and other examples, the driver 422 can configure the acceleration engine 412 to perform the operation. For example, the driver 422 can identify a neural network that the acceleration engine 412 is to execute, as well as the location in the processor memory 404 or on the storage device 406 where the compiled code 444 for the neural network is located. The driver 422 can further load into the acceleration engine 412 or cause the acceleration engine 412 to load the compiled code 444, can load or cause the acceleration engine 412 to load the input data on which the neural network is to operate, and/or can cause the acceleration engine 412 to being executing on the input data. Once the acceleration engine 412 has finished, the acceleration engine 412 can notify the driver 422, and the driver 422 can deliver a result back to the application that requested the result.

As described above, the underlying hardware for implementing the neural network, such as a computing system including a graphic processing unit (GPU), a processing element array, or another processing engine, may generally have a certain number of processing elements (e.g., preconfigured numbers of columns and/or rows) and limited memory space and data read/write bandwidth. For example, the local memory of a neural network processor generally has a small size (e.g., a few megabytes), and thus may not have capacity to hold all tensors for the computations (including input data to be processed and filters) at the same time. The local memory of the neural network processor also has a finite data transfer bandwidth, and thus may take time to load a tensor from an external memory device (e.g., a DRAM on another chip or circuit board). Thus, tensors (including static variables such as filters) used by the neural network processor may need to be appropriately allocated to and removed from the local memory during the execution of the neural network model, such that tensors used for a computation operation by the neural network processor may be available at the local memory with a zero to a minimum latency, in order to fully utilize resources (e.g., the computing power) of the neural network processor to achieve a high performance (e.g., high throughput or short processing time). Thus, the performance of the underlying hardware for implementing the neural network may be limited by both the peak computation performance (e.g., number of floating point operations per second (FLOPS)) of the hardware and the peak bandwidth of the memory system having a fixed size.

An arithmetic intensity factor (AIF) measures the ratio between the number of floating point operations (FLOPs) performed for a given code and the number of memory bytes (or weights) used to support the code. The AIF can be used to identify whether the code is compute-bound or memory-bound. For example, when the AIF associated with a code is large, the efficiency of executing the code may be limited by the computing power of the processing engine and thus the code may be referred to as compute-bound. When the AIF associated with a code is small, the efficiency of executing the code may be limited by the bandwidth of the memory system for transferring data used for the computation and thus the code may be referred to as memory-bound. The AIF may be used to define a roofline model for a given computing system with a specific configuration to analyze neural network performance and determine whether a code to be executed by the computing system is compute-bound or memory-bound.

Figure 5:
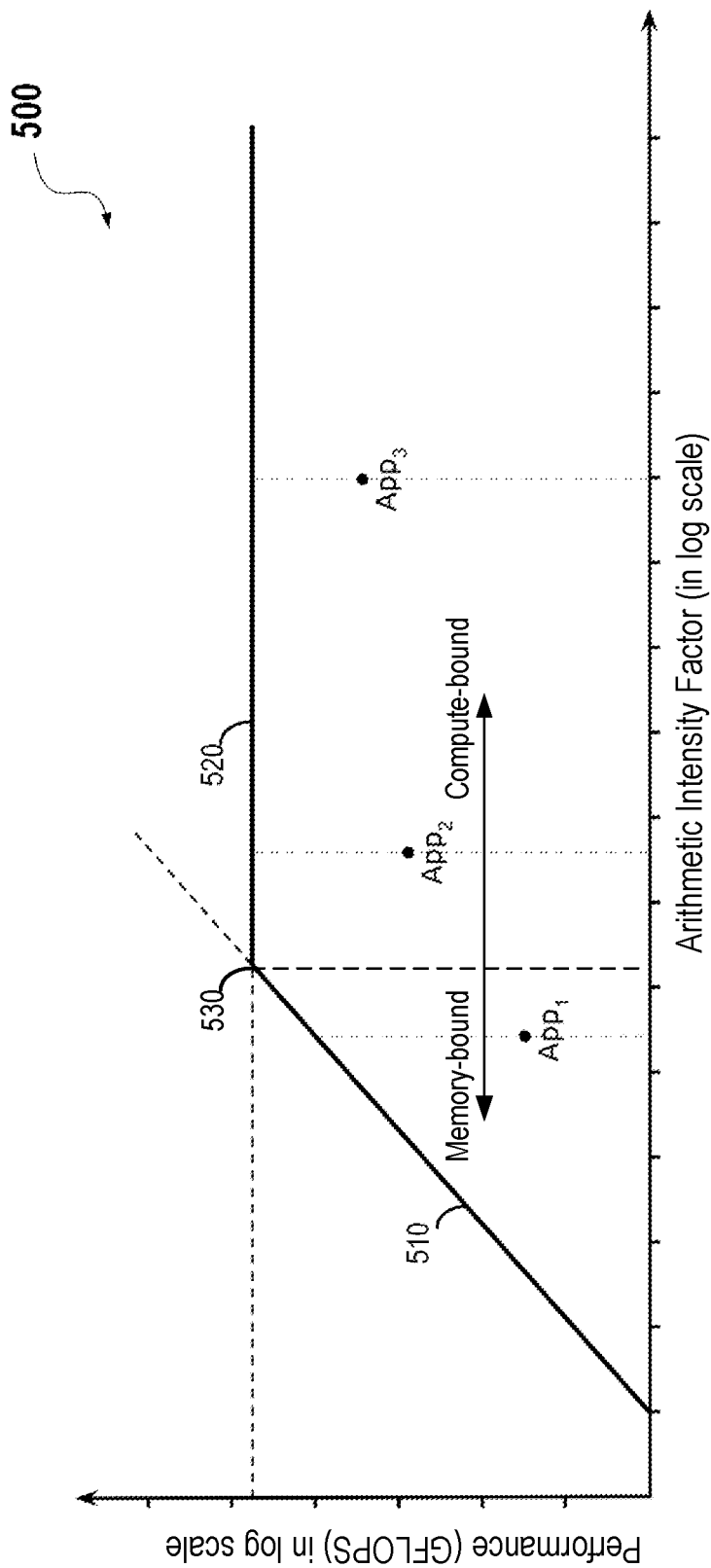
FIG. 5 illustrates an example of a roofline model for a computing system.

FIG. 5 illustrates an example of a roofline model 500 for a computing system. Roofline model 500 shows the floating-point performance (shown by the vertical axis, in GFLOPS) of the computing system bounded by the peak performance ceiling (shown by a line 520) of the computing system, the peak bandwidth ceiling (shown by a line 510) of the computing system, and the arithmetic intensity factor of an operation or application (shown by the horizontal axis). Line 510 correspond to the product of the peak bandwidth of the computing system and the arithmetic intensity factor, where the slope of line 510 may correspond to the peak bandwidth of the computing system. The actual floating-point performance of the computing system may be under both line 510 and line 520.

In FIG. 5, a ridge point 530 at which line 510 and line 520 meet indicates the minimum arithmetic intensity factor of an operation in order to achieve the peak performance of the computing system. In one example, a computing system may perform 64 trillion floating point operations per second (TFLOPS), and the AIF of the ridge-point of the roofline model may be about 64 TFLOPS/(40 GBytes/sec×0.5 weights/Byte)=3,200. The performance of an operation (e.g., App1) having an AIF below the AIF corresponding to ridge point 530 may be bounded by line 510 and thus may be memory-bounded. The performance of operations (e.g., App2 and App3) having AIFs above the AIF corresponding to ridge point 530 may be bounded by line 520 and thus may be compute-bounded.

In a computing system with a finite-sized local memory, the memory allocation scheme, such as when and where to load the input data and static variables for the computation and whether and when to remove the loaded data to make room for new data, may also affect the achievable performance of a computing system with a fixed hardware configuration (and thus a fixed peak performance and peak bandwidth). The memory allocation may be determined by a compiler that may also generate and schedule instructions to be executed by the neural network processor or other execution engines (e.g., direct memory access (DMA) engines) of the computing system to implement a neural network model. The instructions may generally include instructions for memory load operations that read input data (e.g., input feature maps) and static variables (e.g., weights, such as filter tensors for a convolutional neural network), and instructions for computation operations that use the input data and the static variables to perform arithmetic operations. Some static variables, when loaded into the local memory (e.g., a state buffer), may be used by many computation operations. In many cases, the computation operations that use the same static variables may be farther apart from each other in the neural network model (e.g., a dataflow graph), where other computation operations using other static variables may be between these computation operations that use the same static variables. Thus, the static variables allocated into the local memory may have a long lifetime and may occupy the local memory for a long time. Static variables used by other computation operations may also need to be loaded into the local memory that may have a finite size. The local memory may also need to store input data and intermediate computation results. Therefore, the local memory may not be large enough to store all these data, in particular, when the neural network processor performs multiple batches at the same time.

Figure 6:
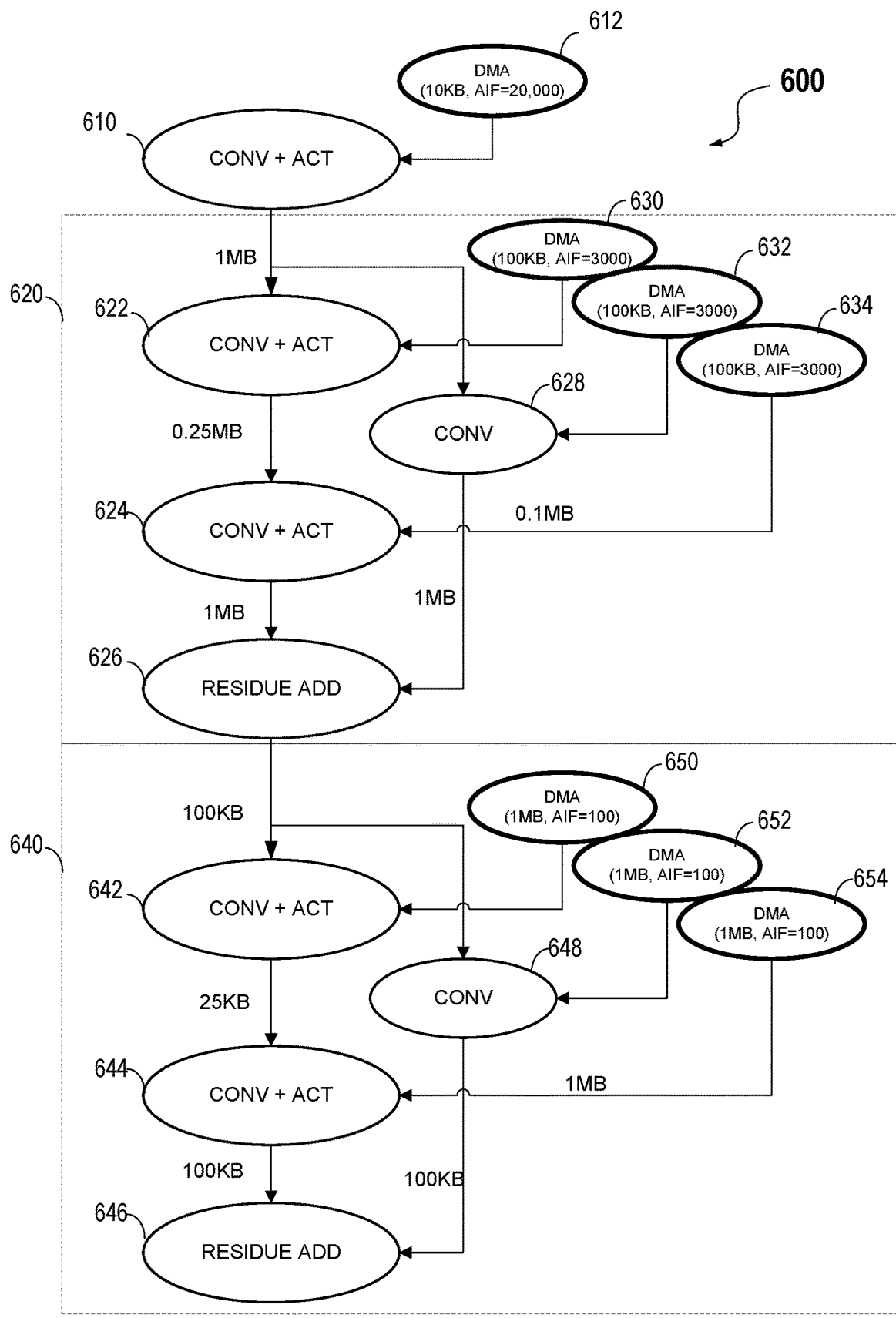
FIG. 6 illustrates a simplified example of a data flow graph for a batch-1 CNN.

FIG. 6 illustrates a simplified example of a graph 600 (e.g., a data flow graph) for a batch-1 CNN that has a structure similar to the structure of a ResNet. Each node in graph 600 may represent a neural network operation, such as a data transfer (or memory load) operation or a computation operation. The connections and the directions of the connections between the nodes may indicate data dependency. In the illustrated example, graph 600 includes a convolution and activation operation 610 that may use input data and static variables (e.g., filters) having a size about 10 KB for the convolution. The static variables may be loaded into a local memory (e.g., memory subsystem 304) by a DMA engine in a load operation 612. The AIF associated with convolution and activation operation 610 and load operation 612 may be about 20,000, which may be higher than the AIF of the ridge-point of the roofline model of the computing system (e.g., about 3,200) and thus convolution and activation operation 610 may be compute-bound. The output tensor of convolution and activation operation 610 may be about 1 MB.

In the example illustrated in FIG. 6, graph 600 may also include one or more blocks having a structure similar to a ResNet-B block. A block 620 of the one or more blocks may include a convolution and activation operation 622, which may use the output tensor of convolution and activation operation 610 and static variables (e.g., about 100 KB) loaded to the local memory by a DMA engine in a load operation 630. The AIF associated with convolution and activation operation 622 and load operation 630 may be about 3,000, which may be close to the AIF of the ridge-point of the roofline model of the computing system (e.g., about 3,200). The output tensor of convolution and activation operation 622 may have a size about 0.25 MB. Block 620 may also include a convolution and activation operation 624, which may use the output tensor of convolution and activation operation 622 and static variables (e.g., about 100 KB) loaded to the local memory by a DMA engine in a load operation 634. The AIF associated with convolution and activation operation 624 and load operation 634 may be about 3,000, which may be close to the AIF of the ridge-point of the roofline model of the computing system (e.g., about 3,200). The output tensor of convolution and activation operation 624 may have a size about 1 MB. Block 620 may further include a convolution operation 628, which may use the output tensor of convolution and activation operation 610 and static variables (e.g., about 100 KB) loaded to the local memory by a DMA engine in a load operation 632. The AIF associated with convolution operation 628 and load operation 632 may be about 3,000, which may be close to the AIF of the ridge-point of the roofline model of the computing system (e.g., about 3,200). The output tensor of convolution operation 628 may have a size about 1 MB. A residue add operation 626 at the end of block 620 may add the output tensor of convolution and activation operation 624 and the output tensor of convolution operation 628, where the output tensor of residue add operation 626 may be about 100 KB.

A block 640 of the one or more blocks may include a convolution and activation operation 642, which may use the output tensor of residue add operation 626 and static variables (e.g., about 1 MB) loaded to the local memory by a DMA engine in a load operation 650. The AIF associated with convolution and activation operation 642 and load operation 650 may be about 100, which may be much lower than the AIF of the ridge-point of the roofline model of the computing system (e.g., about 3,200). The output tensor of convolution and activation operation 642 may have a size about 25 KB. Block 640 may also include a convolution and activation operation 644, which may use the output tensor of convolution and activation operation 642 and static variables (e.g., about 1 MB) loaded to the local memory by a DMA engine in a load operation 654. The AIF associated with convolution and activation operation 644 and load operation 654 may be about 100, which may be much lower than the AIF of the ridge-point of the roofline model of the computing system (e.g., about 3,200). The output tensor of convolution and activation operation 644 may have a size about 100 KB. Block 620 may further include a convolution operation 648, which may use the output tensor of residue add operation 626 and static variables (e.g., about 1 MB) loaded to the local memory by a DMA engine in a load operation 652. The AIF associated with convolution operation 648 and load operation 652 may be about 100, which may be much lower than the AIF of the ridge-point of the roofline model of the computing system (e.g., about 3,200). The output tensor of convolution operation 628 may have a size about 100 KB. A residue add operation 646 at the end of block 640 may add the output tensor of convolution and activation operation 644 and the output tensor of convolution operation 648.

In the example illustrated in FIG. 6, the maximal DMA transfer size is about 1 MB, and the maximal state-size (input or output tensor) is about 1 MB. Thus, the maximal total size of the input data and static variables for an operation may be about 2 MB (e.g., for residue add operation 626). Graph 600 may be scheduled to execute on an accelerator (or another processing engine) with a local memory having a size about 4 MB. There is no need to evict loaded static variables and then reload the same static variables at a later stage (which may be referred to as "re-materialization"). However, the AIFs associated with load operations 650, 652, and 654 are about 100, much lower the ridge-point of the roofline model of the computing system (e.g., about 3,200). Thus, operations in block 640 of graph 600 may be memory-bound. To better utilize the computing power and improve the performance (e.g., the throughput) of the accelerator, batch processing may be scheduled for the accelerator to process multiple batches of input data using the same loaded static variables (e.g., weights, such as filter tensors for CNN).

Figure 7:
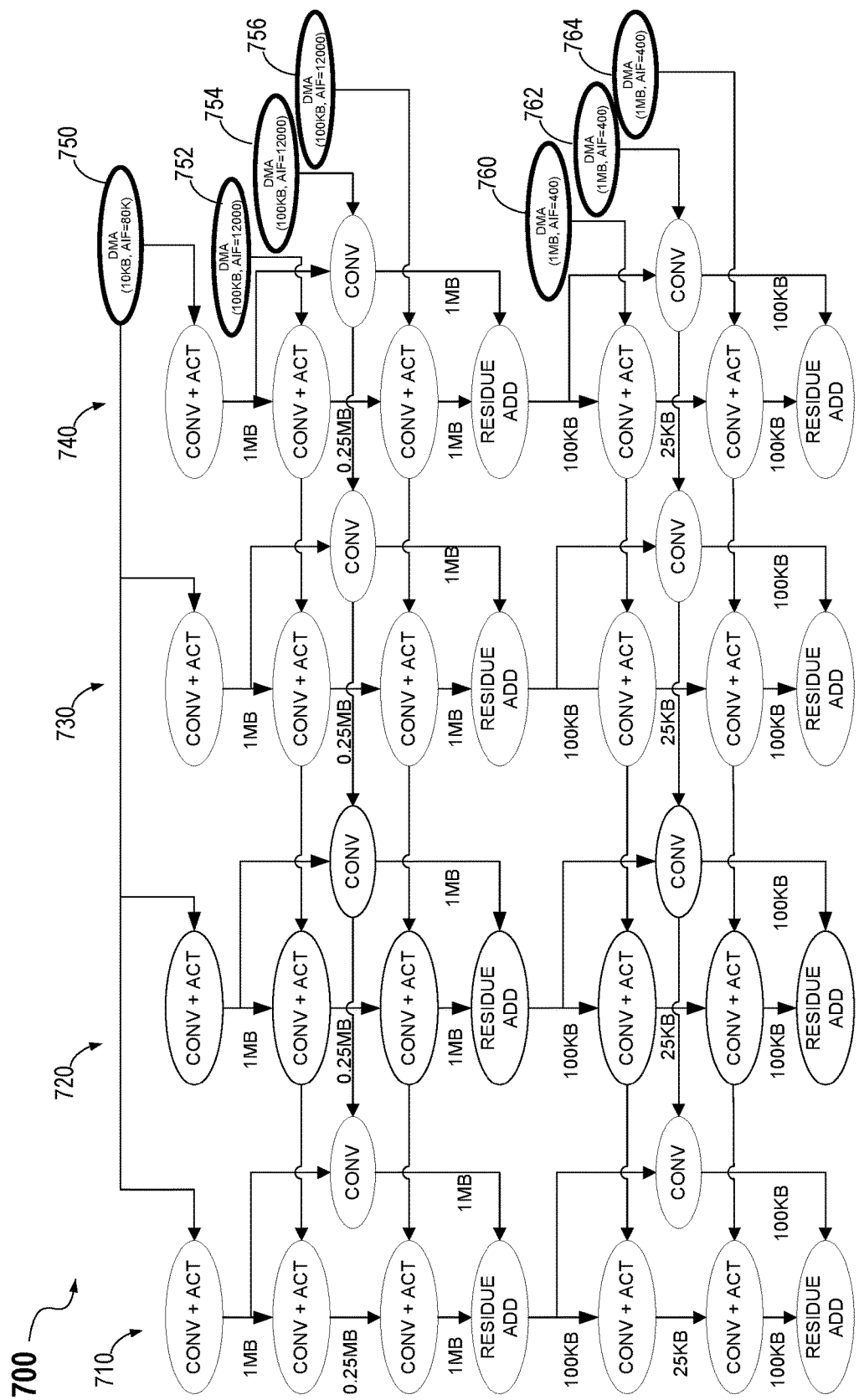
FIG. 7 illustrates an example of a data flow graph for a batch-4 CNN.

FIG. 7 illustrates an example of a graph 700 for a batch-4 CNN. The CNN for each batch may have a structure similar to the structure of a ResNet shown in FIG. 6. Graph 700 may include four processing flows 710, 720, 730, and 740 (corresponding to four batches) that share static variables loaded by DMA engines in load operations 750, 752, 754, 756, 760, 762, and 764. For example, the 10-KB static variables loaded by load operation 750 may be used by four convolution and activation operations of the four respective processing flows, and thus the AIF associated with load operation 750 may be about 80,000, which is about 4 times of the AIF associated with load operation 612. Similarly, the 100-KB static variables loaded by each of load operations 752, 754, and 756 may be used by four computation operations of the four respective processing flows, and thus the AIF associated with each of load operations 752, 754, and 756 may be about 12,000, which is about 4 times of the AIF associated with each of load operations 630, 632, and 634. The 1-MB static variables loaded by each of load operations 760, 762, and 764 may be used by four computation operations of the four respective processing flows, and thus the AIF associated with each of load operations 760, 762, and 764 may be about 400, which is about 4 times of the AIF associated with each of load operations 650, 652, and 654.

In the neural network model described by graph 700, the AIFs associated with the load operations by the DMA engine may be improved, but the scheduling and the memory allocation can be more complicated and difficult. For example, when the size of the local memory is about 4 MB as in the example described above with respect to FIG. 6, both a breadth-first scheduling (BFS) and a depth-first scheduling (DFS) may need to evict some loaded static variables and then reload the same static variables at one or more later stages. In one example, when the BFS-based scheduling is used, because static variables loaded to the local memory by a load operation may be used by four operations in the four respective processing flows, and the size of the input or output tensor of each processing flow may be up to about 1 MB, the total size of the memory used by the four processing flows (including the input/output tensor and the static variables) may be greater than 4 MB, such as about 8 MB at the residue add layer. When the DFS-based scheduling is used, because the static variables loaded by load operations 750, 752, 754, 756, 760, 762, and 764 (more than 3 MB) may need to remain in the local memory throughout the execution of the 4 processing flows so that they can be used in each processing flow, and the maximal size of the state in each processing flow may be about 2 MB or more, the total size of the memory used by a processing flow (including the input/output tensor and the static variables) may be greater than 4 MB.

Thus, in many cases, it may be desirable to reduce the lifetime of loaded static variables such that the local memory can be freed to store new variables and data for other operations. In some implementations, the lifetime of the loaded static variables may be reduced by loading the static variables from an external memory into the local memory each time the static variables are used by a computation operation or a series of continuous computation operations, and removing the loaded static variables from the local memory after the use (instead of keeping them in the local memory throughout the execution of the graph) to make room for other static variables and input/output tensors.

Figure 8:
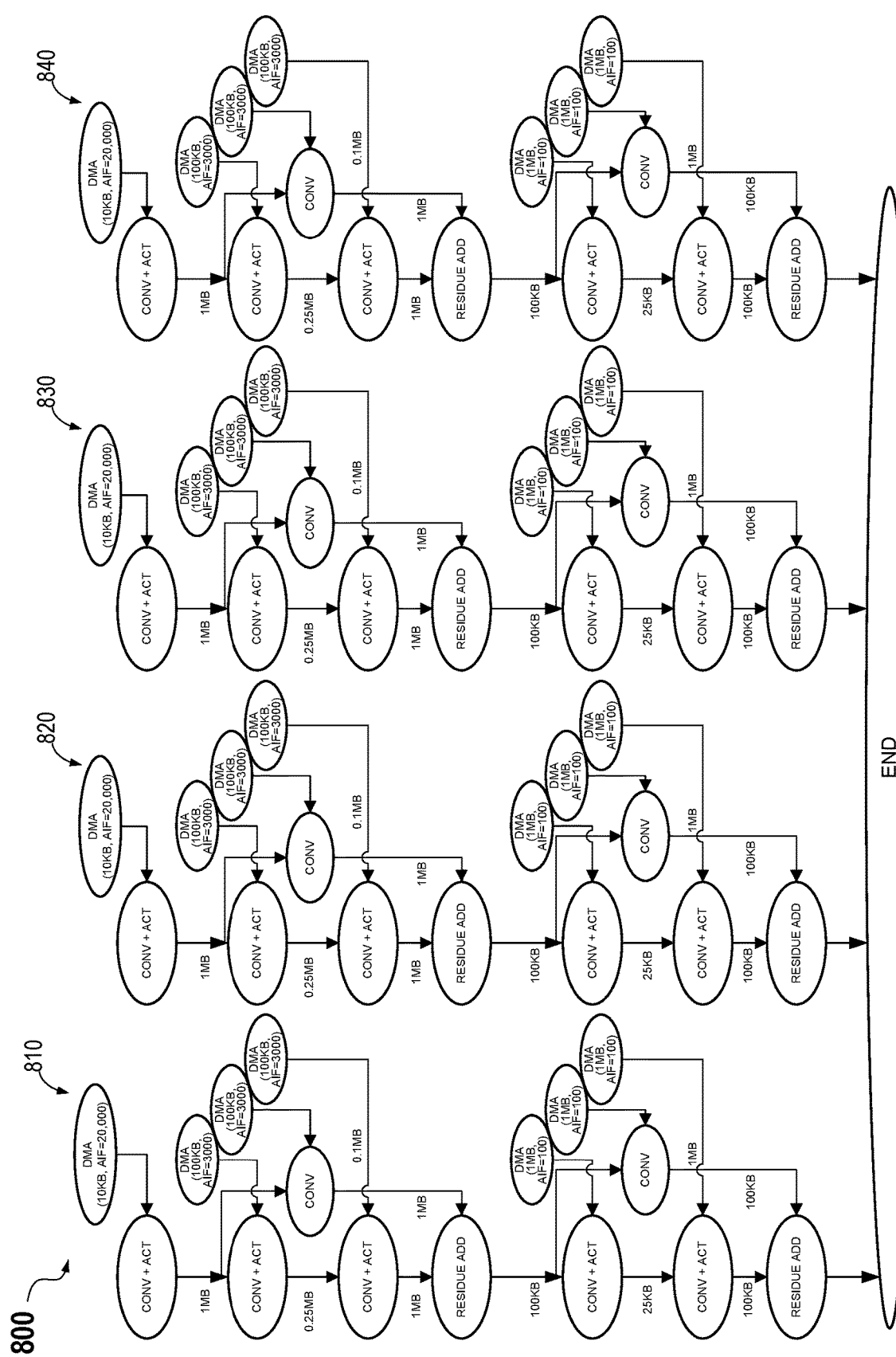
FIG. 8 illustrates an example of a data flow graph including cloning for each load operation for a batch-4 CNN.

FIG. 8 illustrates an example of a graph 800 including cloning for each load operation for a batch-4 CNN. The CNN for each batch may have a structure similar to the structure of a ResNet shown in FIG. 6. Graph 800 may include four processing flows 810, 820, 830, and 840 (corresponding to four batches, respectively) scheduled using the DFS-based scheduling technique. Each of the four processing flows may be similar to the flow in graph 600. In each of the four processing flows, static variables may be loaded into the local memory before the static variables are used by a computation operation and may be evicted from the local memory after the computation operation to make space for storing other data, due to the finite size of the local memory.

Thus, the four processing flows in graph 800 may be implemented by sequentially repeating graph 600 four times, without reusing the loaded static variables. Therefore, the AIF associated with each load operation may be the same as the AIF associated with the corresponding load operation in graph 600, without reducing the usage of the memory bandwidth (and the data fetch latency) and improving the computation throughput. As such, the efficiency of the computing system may not be improved by the batch processing showing in graph 800. It may be desirable to reduce the number of cloning of the load operations, while still meeting the local memory usage condition. This may be achieved by determining where static variables may be re-materialized in the data flow graph implemented by a computing system that has finite local memory and memory bandwidth, without degrading the overall performance of the computing system, and selectively re-materializing the static variables.

According to certain embodiments, a compiler may use the AIFs associated with the load operations for operation scheduling and memory allocation to more efficiently apply re-materialization while achieving as many benefits of batch processing as possible. For example, the compiler may group nodes (e.g., computation operations) in data flow graph of a neural network model that may use the same static variables and may have low AIFs (memory-bound), to achieve a higher AIF through batch processing. The compiler may schedule nodes in a same group to be executed together. For example, computation operations associated with load operation 760, 762, or 764 may use the same static variables and may have low AIFs, and thus may be grouped together and scheduled to be executed together according to a BFS-based scheduling, without performing re-materialization of the static variables. For nodes that have high AIFs, relatively large state sizes, but relatively small weight size, and/or for nodes that use the same static variables but are far from each other in the graph, the compiler may schedule the operations to be executed at different time (e.g., using a DFS-based scheduling), and may, in some cases, add load operations to re-load the static variables before each use if the local memory does not have the capacity to hold the static variables for a long time. In this way, the compiler may use various combinations of DFS-based scheduling and BFS-based scheduling for a graph to maximize AIFs and reduce reloading (and bandwidth usage) by grouping low-AIF operations, while reducing memory usage by reloading static variables for operations that may have high AIFs (e.g., compute-bound).

Figure 9:
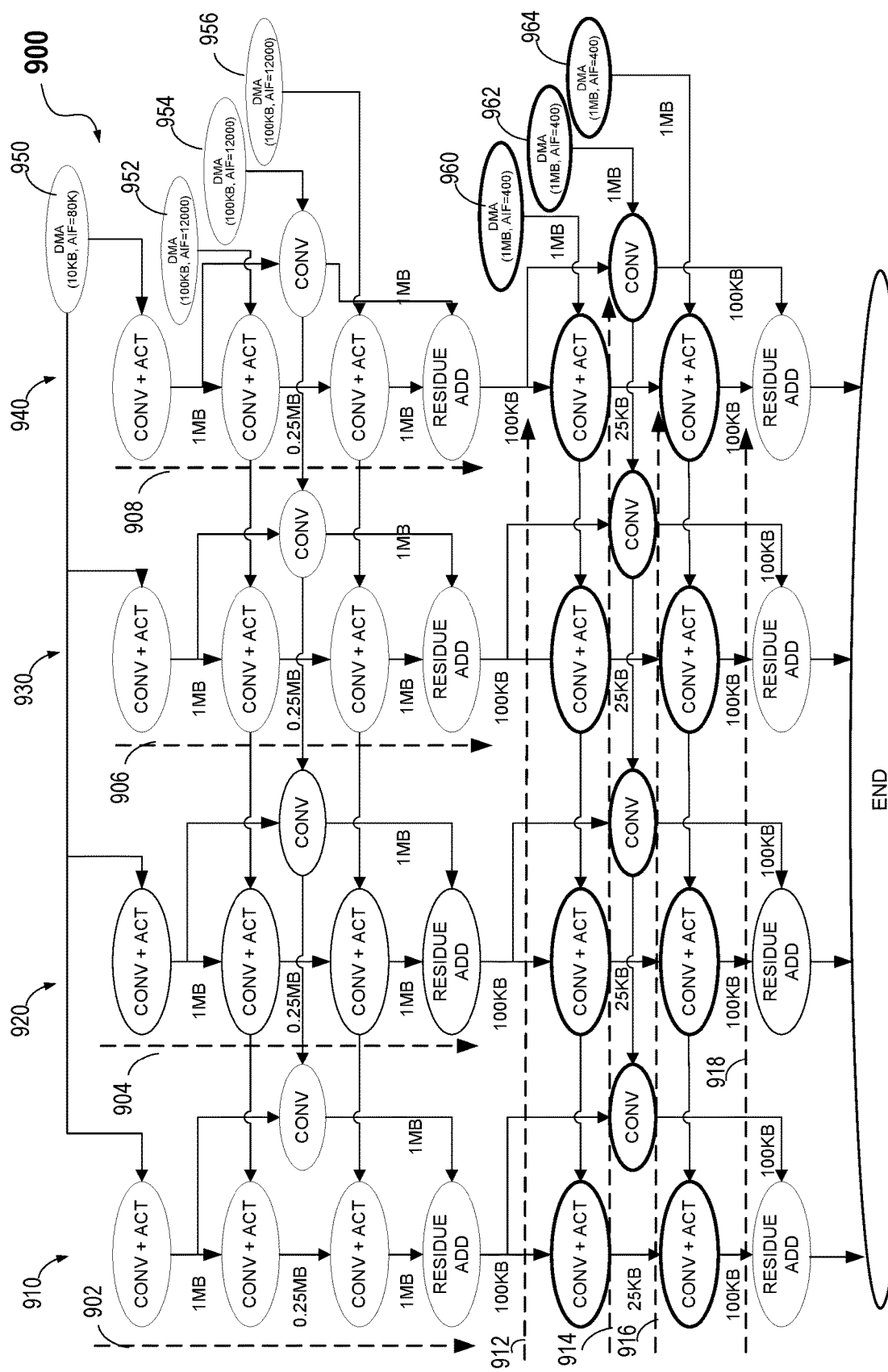
FIG. 9 illustrates an example of scheduling operations in a data flow graph of a batch-4 CNN according to certain embodiments.

FIG. 9 illustrates an example of scheduling operations in a graph 900 for a batch-4 CNN according to certain embodiments. Graph 900 may be similar to graph 700, and may include four processing flows 910, 920, 930, and 940, each corresponding to a respective batch. Rather than scheduling the operations of graph 900 using the BFS-based scheduling shown in FIG. 7 or using the DFS-based scheduling shown in FIG. 8, the compiler may schedule some operations using the BFS-based scheduling, while scheduling some other operations using the DFS-based scheduling.

In the example illustrated in FIG. 9, computation operations associated with load operations 950, 952, 954, and 956 may have high AIFs and relatively small weight sizes. These computation operations may be scheduled using the DFS-based scheduling, such that the corresponding operations in processing flow 910 may be performed according to a flow 902, the corresponding operations in processing flow 920 may be performed according to a flow 904, the corresponding operations in processing flow 930 may be performed according to a flow 906, and the corresponding operations in processing flow 940 may be performed according to a flow 908.

Load operations 950, 952, 954, and 956 may each be performed once only when flow 902 is performed, and the loaded static variables may remain in the local memory until flow 908 is performed. Therefore, the AIFs associated with load operations 950, 952, 954, and 956 may be about 4 times of the corresponding AIFs associated with load operations 612, 630, 632, and 634, respectively. The maximal size of local memory used during flow 902 may be about 2.31 MB (e.g., during the residue add operation at the end of flow 902). After flow 902 is performed, only 0.41 MB data (0.31 MB for the static variables and 0.1 MB for the output tensor of the residue add operation) may need to be retained in the local memory. Flow 904 may be performed after flow 902 and may use the static variables that remain in the local memory. During flow 904, the maximal size of useful data in the local memory may be about 2.41 MB (e.g., during the residue add operation at the end of flow 904 and including the 0.1 MB output tensor of flow 902). After flow 904 is performed, only 0.51 MB data (0.31 MB for the static variables and 0.2 MB for the output tensors of flow 902 and flow 904) may need to be retained in the local memory. Similarly, flow 906 may be performed after flow 904 and may use the static variables that remain in the local memory. During flow 906, the maximal size of useful data in the local memory may be about 2.51 MB (e.g., during the residue add operation at the end of flow 906 and including the 0.2 MB output tensors of flow 902 and flow 904). After flow 906 is performed, only 0.61 MB data (0.31 MB for the static variables and 0.3 MB for the output tensors of flows 902, 904, and 906) may need to be retained in the local memory. Flow 908 may be performed after flow 906 and may use the static variables that remain in the local memory. During flow 908, the maximal size of useful data in the local memory may be about 2.61 MB (e.g., during the residue add operation at the end of flow 906 and including the 0.3 MB output tensors of flows 902, 904, and 906). After flow 908 is performed, only 0.4 MB data (the output tensors of flows 902, 904, 906, and 908) may need to be retained in the local memory.

Computation operations associated with load operations 960, 962, and 964 may have low AIFs and relatively large weight sizes, and may be scheduled to be performed after flow 908. These computation operations may be scheduled using the BFS-based scheduling, such that operations of the four processing flows using static variables loaded by load operation 960 may be performed according to a flow 912, operations of the four processing flows using static variables loaded by load operation 962 may be performed according to a flow 914, operations of the four processing flows using static variables loaded by load operation 964 may be performed according to a flow 916, and residue add operations at the ends of the four processing flows may be performed according to a flow 918.

In flow 912, load operation 960 may be performed once, and the corresponding convolution and activation operations in the four processing flows may be performed using the loaded static variables and the output tensors of flows 902, 904, 906, and 908, respectively. The AIF associated with load operation 960 (e.g., about 400) may be about four times of the AIF associated with load operation 650 (e.g., about 100). During flow 912, the maximal size of the data in the local memory and used for the operation may be about 1.4 MB (e.g., including about 0.4 MB for input tensors and about 1 MB for the static variables). After flow 912 is performed, only about 0.5-MB data (25 KB×4+100 KB×4) may need to be retained in the local memory. Similarly, in flow 914, load operation 962 may be performed once, and the corresponding convolution operations in the four processing flows may be performed using the loaded static variables and the output tensors of flows 902, 904, 906, and 908. The AIF associated with load operation 962 (e.g., about 400) may be about four times of the AIF associated with load operation 652 (e.g., about 100). During flow 914, the useful data in the local memory may be about 1.5 MB (e.g., including about 0.4 MB for input tensors, about 1 MB for the static variables, and about 0.1 MB for the output tensors of flow 912). After flow 914 is performed, only about 0.5-MB data (100 KB×4+25 KB×4) may need to be retained in the local memory. In flow 916, load operation 964 may be performed once, and the corresponding convolution and activation operations in the four processing flows may be performed using the loaded static variables and the output tensors of flow 912. The AIF associated with load operation 964 (e.g., about 400) may be about four times of the AIF associated with load operation 654 (e.g., about 100). During flow 916, the maximal size of the useful data in the local memory may be about 1.5 MB (e.g., including 0.1 MB for input tensors, 1 MB for the static variables, and about 0.4 MB for output tensors of flow 914). After flow 916 is performed, only about 0.8-MB (100 KB×4+100 KB×4) data may need to be retained in the local memory. During flow 918, the output tensors from flow 914 and flow 916 may be added by the residue add operations.

Therefore, in the example shown in FIG. 9, small-sized static variables associated with high AIFs may be kept in the local memory for a longer time period in the DFS-based scheduling, while large-sized static variables associated with low AIFs may be loaded before use and evicted after use in the BFS-based scheduling. By using both the BFS-based scheduling and the DFS-based scheduling, the AIFs associated with the load operations can be improved and no re-materialization of the static variable may be needed, and thus the overall performance of the computing system implementing graph 900 may be improved.

It is noted that the example shown in FIG. 9 is for illustration purposes only. In other implementations or for other neural network graphs, other combinations of the BFS-based scheduling and DFS-based scheduling may be used. For example, operations on some layers in a batch-N process may be scheduled using BFS-based scheduling, operations on some layers in the batch-N process may be scheduled using DFS-based scheduling, while operations on some layers in the batch-N process may be scheduled using both BFS-based scheduling and DFS-based scheduling.

Figure 10:
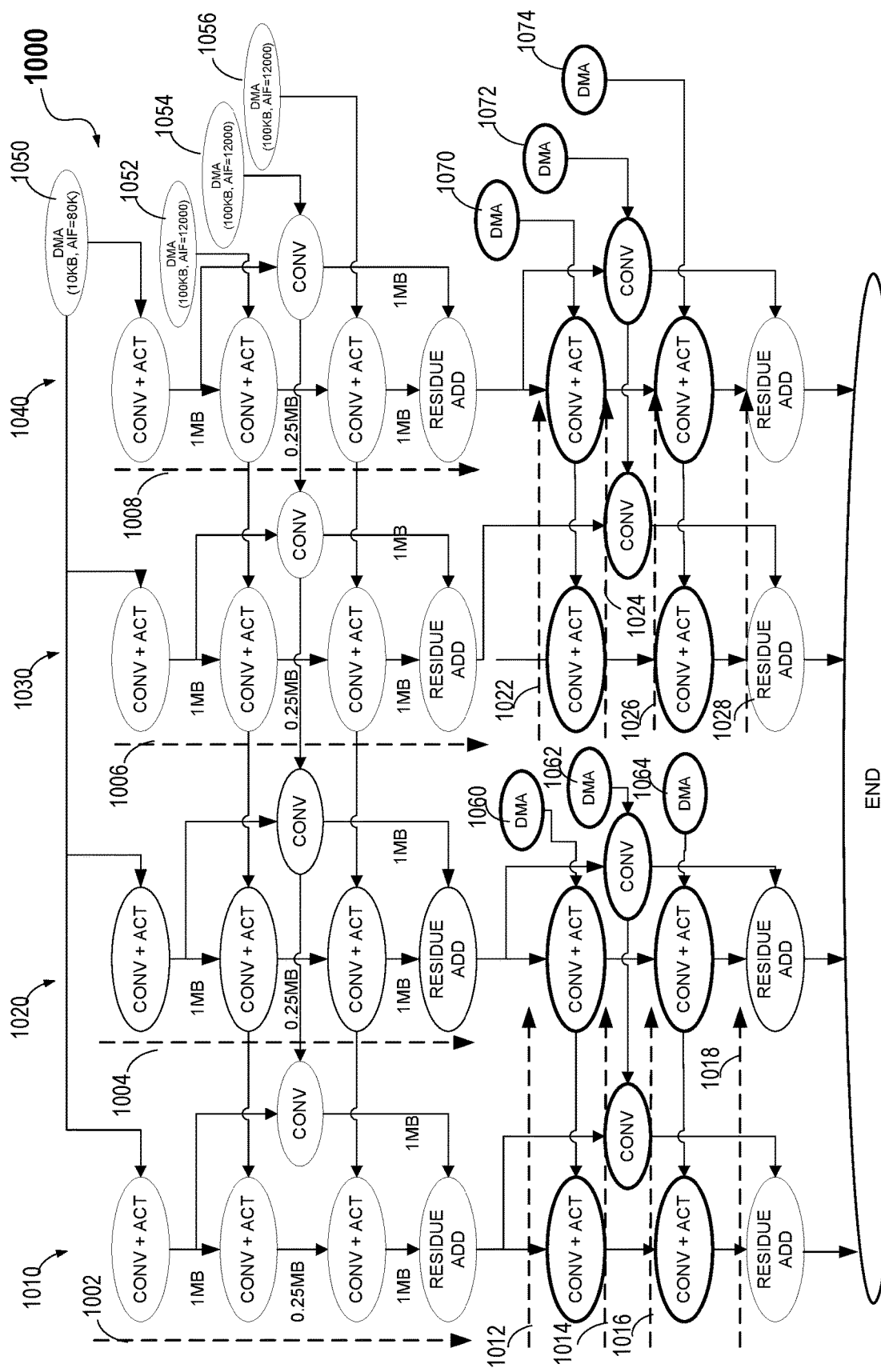
FIG. 10 illustrates another example of scheduling operations in a graph of a batch-4 CNN according to certain embodiments.

FIG. 10 illustrates an example of scheduling operations in a graph 1000 for a batch-4 CNN according to certain embodiments. Graph 1000 may be similar to graph 900, and may include four processing flows 1010, 1020, 1030, and 1040 corresponding to four batches. Rather than scheduling the operations of graph 1000 using the BFS-based scheduling for some layers and using the DFS-based scheduling for other layers as shown in FIG. 9, the compiler may schedule operations on a same layer using both the BFS-based scheduling and the DFS-based scheduling. In graph 1000 shown in FIG. 10, flows 1002, 1004, 1006, and 1008 may be similar to flows 902, 904, 906, and 908 shown in FIG. 9, where static variables loaded by load operations 1050, 1052, 1054, and 1056 may remain in the local memory until flow 1008 has been performed. Graph 1000 may also include flows 1012, 1014, 1016, 1018, 1022, 1024, 1026, and 1028 that are different from flows 912, 914, 916, and 918 shown in FIG. 9.

In the example illustrated in FIG. 10, the size of the local memory may not be large enough to store both the static variables loaded by a load operation 1060, 1062, or 1064 and input tensors for the four convolution and activation operations in the four processing flows. Thus, the four convolution and activation operations may be divided into two groups each including two convolution and activation operations, where the two convolution and activation operations in a same group may be scheduled using the BFS-based scheduling as shown by flow 1012 or 1022. Similarly, the four convolution operations in the next layer in the four processing flows may be divided into two groups each including two convolution operations, where the two convolution operations in a same group may be scheduled using the BFS-based scheduling as shown by flow 1014 or 1024. The four convolution and activation operations in the next layer in the four processing flows may be divided into two groups each including two convolution and activation operations, where the two convolution and activation operations in a same group may be scheduled using the BFS-based scheduling as shown by flow 1016 or 1026. The four residue add operations at the ends of the four processing flows may be divided into two groups each including two residue add operations, where the two residue add operations in a same group may be scheduled using BFS-based scheduling as shown by flow 1018 or 1028. Load operations 1060, 1062, and 1064 may be cloned and added to the graph as load operations 1070, 1072, and 1074 to reload or re-materialize the static variables.

To implement the bottom portion of graph 1000, load operation 1060, flow 1012, load operation 1062, flow 1014, load operation 1064, flow 1016, and flow 1018 may be performed sequentially, and then load operation 1070, flow 1022, load operation 1072, flow 1024, load operation 1074, flow 1026, and flow 1028 may be performed sequentially. The static variables loaded into the local memory by load operations 1060, 1062, 1064, 1070, 1072, and 1074 may be evicted from the local memory after the respective flows 1012, 1014, 1016, 1022, 1024, and 1026 are performed. In this way, the bottom portion of graph 1000 may be scheduled using both the BFS-based scheduling and DFS-based scheduling.

In another embodiment, graph 1000 may be scheduled such that flows 1002 and 1004 may be performed first, followed by flows 1012, 1014, 1016, and 1018, and then flows 1006 and 1008 may be performed, followed by flows 1022, 1024, 1026, and 1028. In some embodiments, some intermediate output tensors may be saved in external memory, and may be loaded into the local memory when they are used in the subsequent flows.

As described above, in some graphs, such as batch-N (N>1) CNN graphs, the size of the local memory may not be large enough to hold all tensors and static variables for the batch processing. Some static variables may need to be evicted from the local memory after use (to reduce the lifetime and the need for larger local memory space), and may need to be reloaded or re-materialized when the static variables are used again in a later stage. However, if a load operation is inserted in front of every use of the static variables to reduce the local memory space usage as shown in FIG. 8, there may be too many load operations such that the advantages of batch processing may not be achieved.

According to certain embodiments, local arithmetic intensity factors may be used to distinguish between compute-bound portions of the graph that have high arithmetic intensities (where inserting additional load operations may not reduce the performance of the computing system) and memory-bound portions of the graph that have low arithmetic intensities (where the performance may be limited by the performance of the memory subsystem and thus inserting additional load operations may degrade the performance). The neural network compiler may organize computation operations that use the same static variables (e.g., weights, such as filter tensors for a CNN) into one or more groups (or clusters) using various clustering techniques, based on, for example, arithmetic intensity factors associated with the computation operations and distances between the computation operations (e.g., number of other operations between two computation operations using the same static variables).

Load operations may be inserted before each group (or cluster) of computation operations, rather than in front of each computation operation. Therefore, static variables loaded by a load operation may be used by a group of computation operations, rather than a single computation operation. As such, the number of cloning of the load operation, the use of the memory bandwidth, and the latency may be reduced. In addition, the group (or cluster) of computation operations that use the same static variables loaded by a load operation can be close to the load operation to reduce the lifetime of the loaded static variables, thereby reducing the usage of the finite-sized local memory of the processing engine by the loaded static variables. In addition, because the operations may be compute-bound, adding load operations may not degrade the performance of the processing engine. As a result, the throughput or the processing time of the neural network processor may be improved. The load cloning by the pre-scheduler may facilitate the allocation of tensors into the local memory by an allocator.

In some embodiments, local memory usage by a neural network model may be determined based on, for example, the memory locations the operations write to. If the maximal local memory usage is lower than the size of the local memory, the loaded data may be stored in the local memory for use at later stages, and may not need to be evicted and then reloaded before it is used again. If the maximal local memory usage is greater than the size of the local memory, some re-materialization may need to be performed using techniques disclosed herein.

In some embodiments, the grouping of the computation operations may be based on an interference graph (IG), where nodes of the IG indicate lifetimes of tensors, and an edge connecting two nodes indicates that the lifetimes of the two nodes intersect. When there are many intersections in the IG, more tensors may be alive at the same time and may need to be allocated into the local memory, and thus it can be difficult for the allocator to allocate all these tensors to the local memory. Therefore, some tensors may need to be evicted when they are not in use and may be reloaded or re-materialized before they are used again.

According to certain embodiments, the arithmetic intensity factor for each load operation in the neural network may be determined by determining the total number of arithmetic operations (e.g., multiplications and additions) using data loaded by the load operation, and dividing the total number of arithmetic operations by the number of bytes (or weights) loaded by the load operation. Load operations with AIFs greater than a threshold value (e.g., determined based on the ridge point of a roofline model described above) may be compute-bound, and thus adding load operations to reload or re-materialize the associated data may not reduce the performance of the computing system.

For each load operation with an AIF greater than a threshold value, computation operations that use the data loaded by the load operation may be organized into one or more clusters. For example, computation operations using the same loaded data may be mapped into a cluster based on the memory location objects (e.g., two-dimensional regions of the local memory corresponding to tensors) the computation operations write to, where computation operations that write to the same memory location object may form a node in the cluster, and different nodes in the cluster may correspond to computation operations that write to different memory location objects. In some embodiments, the nodes in the cluster may be sorted based on the time order that the corresponding memory location objects are written by the computation operations. The nodes in the cluster may then be split into one or more clusters to optimize the number and locations of load operations that can be added to the graph, where a load operation may be added in front of each cluster of computation operations that corresponds to a cluster of nodes.

In one implementation, nodes in the cluster may be split iteratively to refine the set of clusters until further splitting may not improve the performance of the computing system for implementing the neural network model. The performance of the computing system for implementing the neural network model may be estimated based on, for example, the AIFs of the load operation before and/or after the splitting, distances between clusters, distances between nodes in a cluster, or any combination. The distance between two nodes may be determined based on the number of computation operations between the computation operations corresponding to the two nodes, not including the computation operations corresponding to either one of the two nodes. An intra-cluster distance may be the sum or the average of the distance between each pair of nodes in the cluster. The distance between two clusters can be evaluated based on the number of computation operations between them, not including the computation operations inside either one of the two clusters. In some embodiments, the inter-cluster distance between two clusters may be the sum or the average of the distance between a node in one cluster and a node in the other cluster for each pair of nodes including one node from one cluster and one node from the other cluster.

In each iteration, a cluster with the largest intra-cluster distance may be selected, and nodes in the cluster may be split into two candidate clusters. The performance of the potential splitting may be evaluated, and the potential splitting may be accepted if the splitting may improve the performance. In one example, the potential splitting of a cluster may first be evaluated based on the estimated AIF after the potential splitting. As described above, when computation operations for a load operation are split into groups and a load operation is add in front of each group, the AIF associated with each load operation may be reduced. Thus, in some embodiments, a cluster may not be further split if the splitting would result in at least one of the new clusters has an associated AIF below a threshold (e.g., the ridge point described above), because the new cluster may be memory-bound and adding a load operation to read from external memory would not improve the performance. If neither one of the new clusters has an AIF below the threshold, the potential splitting may be further evaluated to determine if the potential splitting can improve the overall quality of the clustering. If the potential splitting may improve the overall quality of the clustering, the splitting may proceed. Otherwise, another potential splitting may be evaluated. If no potential splitting may improve the overall quality of the clustering, the splitting of the cluster may be terminated. If no cluster may be split to further improve the overall quality of the clustering, the clustering process may be terminated.

In one example, the overall quality of the clustering may be determined based on the intra-cluster distance and inter-cluster distance described above. For each cluster, the intra-distance of the cluster may be determined, an inter-cluster distance between the cluster and it nearest neighboring cluster may also be determined, and a coefficient of the cluster may be determined by dividing the difference between the inter-cluster distance and the intra-cluster distance by the larger one of the size of the cluster and the size of the nearest neighboring cluster. The overall quality of the clustering may be indicated by the sum or the average of the coefficients for all clusters.

Figure 11:
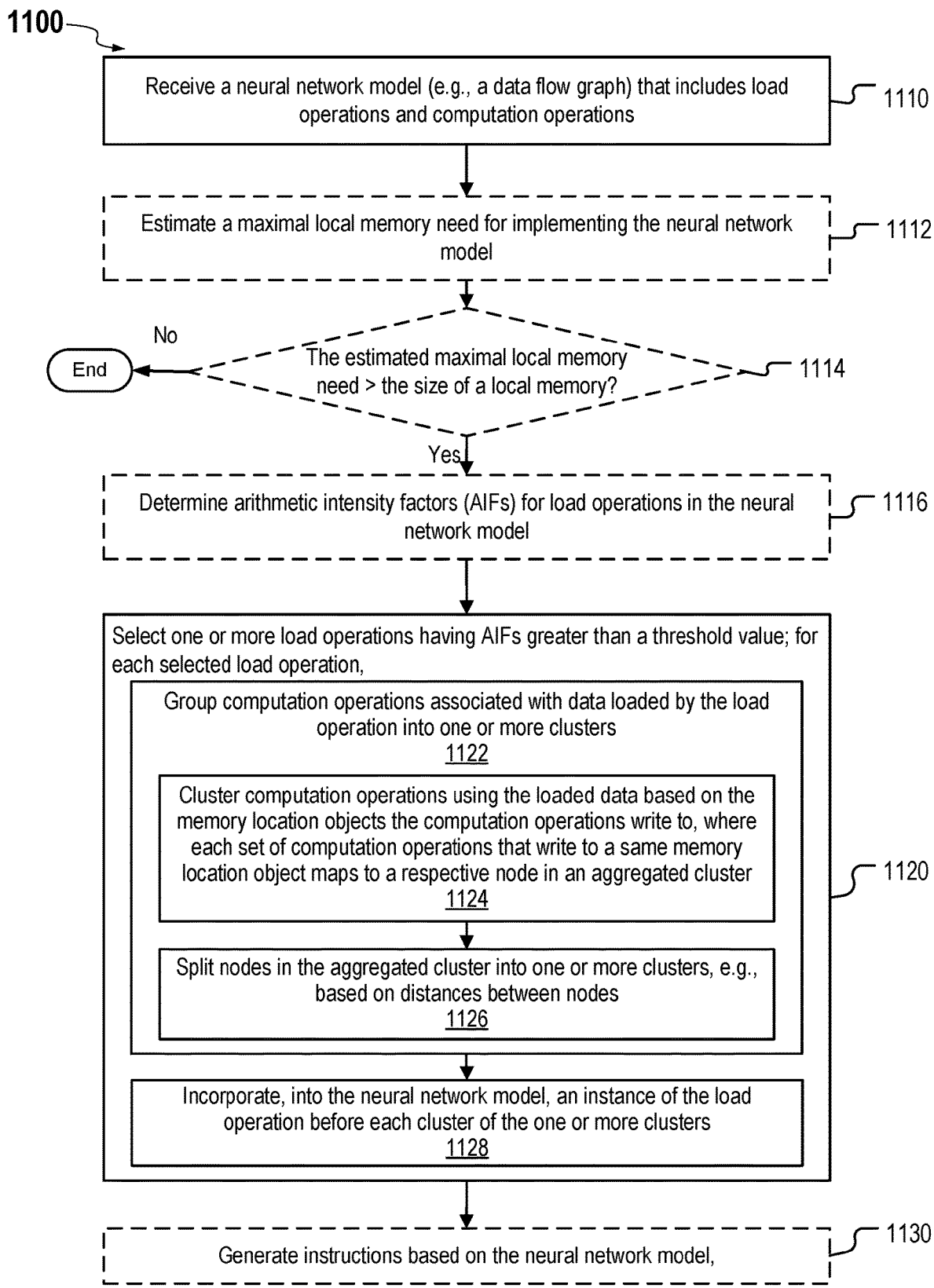
FIG. 11 illustrates an example of a process for load cloning in a neural network model based on arithmetic intensity factors according to certain embodiments.

FIG. 11 includes a flowchart 1100 illustrating an example of a process for load cloning in a neural network model based on arithmetic intensity factors according to certain embodiments. Operations described in flowchart 1100 may be performed by, for example, a compiler running on a host system, such as the compiler and host system described above with respect to FIG. 4. Although flowchart 1100 may describe the operations as a sequential process, in various embodiments, many of the operations may be performed in parallel or concurrently. In addition, the order of the operations may be rearranged. A process may have additional steps not shown in the figure. Furthermore, embodiments of the methods may be implemented by hardware, software, firmware, middleware, microcode, hardware description languages, or any combination thereof. When implemented in software, firmware, middleware, or microcode, the program code or code segments to perform the associated tasks may be stored in a computer-readable medium such as a storage medium or may be carried by a data carrying signal.

At 1110, a computing system implementing a neural network compiler may receive a neural network model (e.g., a data flow graph) that includes memory load operations and a plurality of computation operations. The neural network model may include, for example, a CNN, such as a ResNet, or other neural network models. The neural network model may include a single batch model, or a batch-N model (N>1). The memory load operations may be used to fetch data from an external memory (e.g., DRAM on a different chip or circuit board) and store the data in a local memory that is close to or within a processing engine (e.g., a processing element array). The memory load operations may be performed by, for example, one or more DMA engines. The data loaded into the local memory may include input tensors to be processed and static variables, such as weights of the neural network (e.g., filters of a CNN). Static variables may be parameters of the neural network and may be used by one or more computation operations for processing any input data, such as input images or input feature maps represented by input tensors. For example, in a batch-N model, some static variables may be loaded into the local memory once and may be used to parallelly or serially process multiple batches of input tensors. The local memory may have a finite size, such as about a few megabytes, and thus may not be able to store all static variables of the neural network. Thus, static variables may be loaded into the local memory, used by one or more computation operations, evicted from the local memory after the one or more computation operations, and reloaded to the local memory for other computation operations in later stages. Thus, a neural network model may include one or more memory load operations for loading the same static variables into the local memory. The computation operations may include, for example, convolution operations (e.g., matrix multiplications), activation operations, pooling operations, residue add operations, and the like as described above. For example, a computation operation may take an input tensor and apply one or more filters to the input tensor by performing a convolution operation on the input tensor using the one or more filters. As described above, the convolution operation can be performed in an input-stationary (image-stationary) manner or a weight-stationary manner.

In some embodiments, the computing system may pre-process the neural network model, such as identifying and sorting the memory locations written to by the memory load operations and/or by the computation operations, determining distances between operations, and the like. In some embodiments, the operations may be assigned indices based on their order in the neural network model, and the distance between two operations may be determined based on the difference between their indices.

At 1112, the computing system may optionally analyze the neural network model and estimate a maximal local memory need (e.g., size or capacity) for implementing the neural network model using a processing engine (e.g., accelerator 302 of FIG. 3) that includes a processing element array and a local memory subsystem. As described above, the local memory may have a finite size, such as a few megabytes, and thus may not be able to store all static variables of the neural network model, the input tensor used for a computation operation, and the output tensor of the computation operation. Thus, the neural network model may include operations to load data into the local memory, evict data from the local memory, and reload certain data into the local memory. Based on the operations in the neural network model (which may be a batch-1 or batch-N model), the computing system may determine the maximal local memory size used during the execution of the neural network model as described above, for example, with respect to FIGS. 6-10.

At 1114, the computing system may optionally determine whether the estimated maximal local memory need determined at 1112 is greater than the size of the local memory of the processing engine. If the estimated maximal local memory need determined at 1112 is less than the size of the local memory, the processing engine may be able to implement the neural network model, and no additional data reloading or re-materialization may be needed. If the estimated maximal local memory need determined at 1112 is greater than the size of the local memory, additional memory load operations for data reloading or re-materialization may need to be added to the neural network model to facilitate the scheduling and memory allocation.

At 1116, the computing system implementing the compiler may optionally determine arithmetic intensity factors (AIFs) for the load operations in the neural network model. As described above, it may not be efficient to add a memory load operation before each use of static variables to reduce the maximal local memory space usage during the execution of the neural network model. Thus, according to certain embodiments, AIFs may be used to identify compute-bound operations where adding memory load operations to reduce the maximal local memory space usage may not affect the performance of the processing engine, and the AIFs may also be used to avoid adding memory load operations to memory-bound operations where adding the memory load operations may further increase the bandwidth usage and the data transfer latency and thus may degrade the performance of the processing engine. As described above, the AIF for a memory load operation may be calculated by dividing the number of floating point operations in computation operations that use data loaded by the memory load operation by the number of weights (or bytes) in the data loaded by the memory load operation. An AIF greater than the AIF of the ridge point of a roofline model of the processing engine may indicate a compute-bound condition where the performance of the processing engine may be limited by the computing power of the processing engine, while an AIF lower than the AIF of the ridge point may indicate a memory-bound condition where the performance of the processing engine is limited by the memory bandwidth (or latency) of the memory subsystem for transferring data used by the computation to the local memory.

At 1120, the computing system may select memory load operations having AIFs greater than a threshold value (e.g., the AIF of the ridge point or another AIF value, such as two times of the AIF of the ridge point). These memory load operations may be associated with compute-bound conditions and thus reloading static variables using cloned memory load operations may not reduce the performance of the processing engine.

For each memory load operation with an AIF greater than the threshold value, computation operations that use data loaded by the memory load operation may be grouped into one or more clusters at 1122, and the memory load operation may be replicated and incorporated into the neural network model such that there may be an instance of the memory load operation before each cluster of the one or more clusters at 1128. The instance of the memory load operation before each cluster of the one or more clusters may have a respective AIF greater than the threshold value.

In some embodiments, grouping the computation operations that use the data loaded by the memory load operation may include, at 1124, clustering computation operations using the loaded data based on the memory location objects (e.g., two-dimensional regions of the local memory corresponding to tensors) the computation operations write to. Each set of computation operations that write to a same memory location object may be mapped to a respective node in an aggregated cluster. The aggregated cluster may include multiple nodes corresponding to multiple memory location objects, where each node may correspond to a set of computation operations that write to a same memory location object. In some embodiments, the nodes in the aggregated cluster may be sorted based on the order of the operations represented by the nodes.

Grouping the computation operations that use the data loaded by the memory load operation may also include, at 1126, splitting nodes in the aggregated cluster into one or more clusters, e.g., based on distances between nodes. As described above, the distance between a first node and a second node in the aggregated cluster may correspond to the number of operations between the set of computation operations mapped to the first node and the set of computation operations mapped to the second node. Various clustering techniques may be used for the clustering or splitting based on distances between nodes. The splitting may be performed iteratively to reduce the sum or average of intra-cluster node distances for the clusters and increase the sum or average of inter-cluster node distances for the clusters. An intra-cluster distance may be a sum or an average of the distance between each pair of nodes in a cluster. In some embodiments, the inter-cluster distance between two clusters can be determined based on the number of computation operations between them, not including the computation operations inside either one of the two clusters. In some embodiments, the inter-cluster distance between two clusters may be the sum or the average of the distance between a node in one cluster and a node in the other cluster for each pair of nodes including one node from one cluster and one node from the other cluster. In some embodiments, the inter-cluster distance for a cluster may be determined based on the inter-cluster distance between the cluster and its nearest neighboring cluster.

In some embodiments, splitting the nodes in the aggregated cluster into the one or more clusters of nodes may include splitting an intermediate cluster of nodes in the aggregated cluster into a first candidate cluster of nodes and a second candidate cluster of nodes, determining that both an AIF associated with the first candidate cluster and an AIF associated with the second candidate cluster are greater than the threshold value, determining a quality of clustering after splitting the intermediate cluster, and including the first candidate cluster and the second candidate cluster in the one or more clusters of nodes based on determining that the quality of clustering after splitting the intermediate cluster is higher than a quality of clustering before splitting the intermediate cluster.

In some embodiments, splitting the nodes in the aggregated cluster into the one or more clusters of nodes may include splitting an intermediate cluster of nodes in the aggregated cluster into a first candidate cluster of nodes and a second candidate cluster of nodes, determining that an AIF associated with the first candidate cluster or an AIF associated with the second candidate cluster is lower than the threshold value, and rejecting the splitting of the intermediate cluster of nodes into the first candidate cluster of nodes and the second candidate cluster of nodes.

In one example, in each iteration of the splitting, a cluster with the largest intra-cluster distance may be selected, and nodes in the selected cluster may be tentatively split into two candidate clusters. The potential splitting of the cluster may first be evaluated based on the estimated AIF after the potential splitting. If neither one of the two candidate clusters has an AIF below the threshold, the potential splitting may be further evaluated to determine if the potential splitting can improve the quality of the clustering. The quality of the clustering including the potential splitting may be accepted if the quality of the clustering can be improved by the potential splitting. Otherwise, the potential splitting may be rejected, and another potential splitting may be performed and evaluated. If no potential splitting may improve the quality of the clustering, the splitting of the cluster may be terminated. If no cluster may be split to further improve the quality of the clustering, the clustering process may be terminated.

In some embodiments, the quality of the clustering may be determined based on the intra-cluster distance and inter-cluster distance described above. In general, the quality of the clustering may be improved if the sum or average of the intra-cluster distances for the clusters is reduced and/or the sum or average inter-cluster distances for the clusters is increased. In one example, for each cluster, the intra-distance of the cluster may be determined, an inter-cluster distance between the cluster and it nearest neighboring cluster may also be determined, and a coefficient of the cluster may be determined by dividing the difference between the inter-cluster distance and the intra-cluster distance by the larger one of the size of the cluster and the size of the nearest neighboring cluster. The quality of the clustering may be the sum or the average of the coefficients for all clusters.

At 1130, based on the neural network model that includes the cloned memory load operations in front of each of the determined cluster, the computing system implementing the compiler may generate instructions for execution by the processing engine and other engines (e.g., DMA engines).

Figure 12:
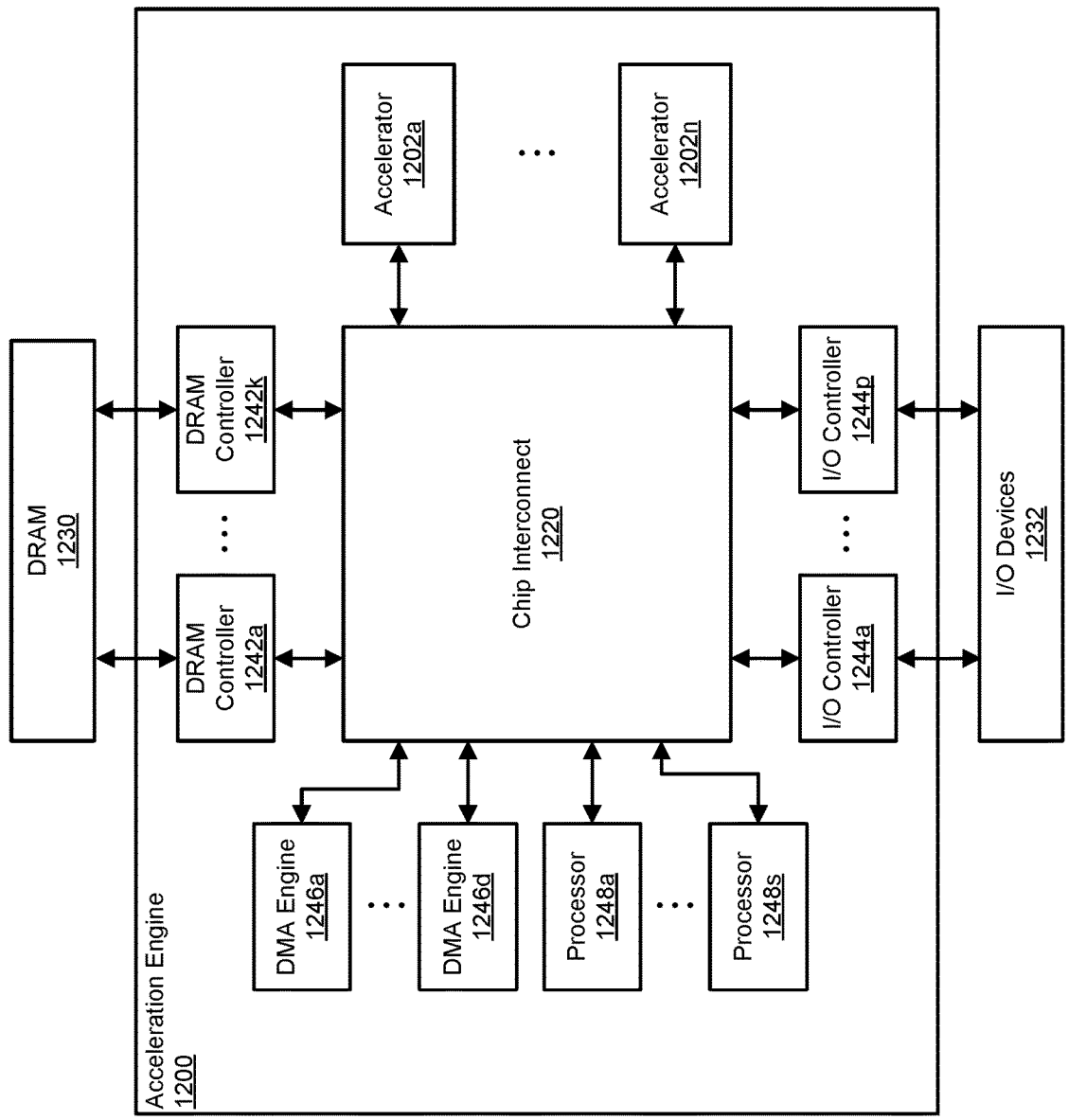
FIG. 12 includes a block diagram of an example of an acceleration engine.

FIG. 12 includes a block diagram that illustrates an example of an acceleration engine 1200. The acceleration engine 1200 is an example of an integrated circuit that can include one or more accelerators 1202a-1202n that may be similar to the accelerator illustrated in FIG. 3.

In the example of FIG. 12, the acceleration engine 1200 includes multiple accelerators 1202a-1202n, each of which can perform a set of operations. In various examples, the accelerators 1202a-1202n are for particular types of operations, so that the accelerators 1202a-1202n can perform the operations much faster than when similar operations are performed by a general purpose processor. In various examples, to perform a set of operations, input data on which the operations are to be performed must first be moved into the accelerators 1202a-1202n. Additionally, in some cases, program code is also moved into the accelerators 1202a-1202n, which programs the operations that the accelerators 1202a-1202n will perform on the data. In the illustrated example, the acceleration engine 1200 includes n accelerators 1202a-1202n. Examples of accelerators that can be included in the acceleration engine 1200 include graphics accelerators, floating point accelerators, neural network accelerators, and others. In various examples, the accelerators 1202a-1202n can each be the same (e.g., each of the is a graphics accelerator) or can be different (e.g., the accelerators 1202a-1202n include a graphics accelerator, a floating point accelerator, and neural network accelerator).

The example acceleration engine 1200 further includes DRAM controllers 1242a-1242k for communicating with an external memory. The external memory is implemented, in this example, using DRAM 1230. In the illustrated example, the acceleration engine 1200 includes k DRAM controllers 1242a-1242k, each of which may be able to communicate with an independent set of banks of DRAM. In other examples, other types of RAM technology can be used for the external memory. The DRAM controllers 1242a-1242k can also be referred to as memory controllers.

In various examples, input data and/or program code for the accelerators 1202a-1202n can be stored in the DRAM 1230. Different programs can cause the accelerators 1202a-1202n to perform different operations. For example, when one of the accelerators is a neural network accelerator, one program can configure the neural network accelerator to perform speech recognition while another program can configure the neural network accelerator to perform image recognition. In various examples, different accelerators 1202a-1202n can be programmed with different programs, so that each performs a different set of operations. In various examples, the processors 1248a-1248s can manage moving of program code from the DRAM 1230 to the accelerators 1202a-1202n.

The example acceleration engine 1200 further includes I/O controllers 1244a-1244p for communicating with I/O devices 1232 in the system. The acceleration engine 1200 can communicate with I/O devices over, for example, a processor bus. In some examples, the processor bus can be implemented using Peripheral Component Interconnect (PCI) and/or a variation of the PCI bus protocol. The processor bus can connect the acceleration engine 1200 to I/O devices such as, for example, input and output devices, memory controllers, storage devices, and/or network interface cards, among other things. In some examples, the I/O controllers 1244-1244p can enable the acceleration engine 1200 to act as an I/O device for a host processor. For example, the acceleration engine 1200 can be the recipient of input data from the host processor, and a command indicating an operation to be performed on the input data (e.g., a particular computation or analysis). In the illustrated example, the acceleration engine 1200 includes p I/O controllers 1244a-1244p, each of which may include a separate root complex and may communicate with a separate set of I/O devices 1232. In other examples, other standardized bus protocols, such as Ultra Path Interconnect (UPI) can be used for the host bus. In other examples, a proprietary bus protocol can be used.

Movement of data in the acceleration engine 1200 can be managed by one or more processors 1248a-1248s, which can also be referred to as data management processors. In the example of FIG. 12, the acceleration engine 1200 includes s processors 1248a-1248s incorporated into the device (e.g., on the same silicon die). In other examples, the processors 1248a-1248s can be external to the acceleration engine 1200 (e.g., on a different die and/or in a different package). In some examples, the processors 1248a-1248s can manage the movement of data from I/O devices 1232 to the accelerators 1202a-1202n or the DRAM 1230. For example, input data may be located at an I/O device 1232 or in processor memory, and the processors 1248a-1248s can move the input from the I/O device 1232 or processor memory into an accelerator or into DRAM 1230. As another example, program code for the accelerators 1202a-1202n may be located on an I/O device 1232 or in processor memory.

The example acceleration engine 1200 further includes DMA engines 1246a-1246d that can move data between the accelerators 1202a-1202n, DRAM controllers 1242a-1242k, and I/O controllers 1244a-1244p. In the illustrated example, the acceleration engine 1200 includes d DMA engines 1246a-1246d. In some implementations, the DMA engines 1246a-1246d can be assigned to specific tasks, such as moving data from the DRAM controllers 1242a-1242d to the accelerators 1202a-1202n, or moving data between the I/O controllers 1244a-1244p and the accelerators 1202a-1202n. These tasks can be assigned, for example, by enqueueing descriptors with the DMA engines 1246a-1246d, where a descriptor identifies an address for a block of data and an operation (e.g., a read or a write) to perform.

A descriptor, for example, can direct a DMA engine to instruct a DMA controller to read a block of data from DRAM 1230. A descriptor can, as a further example, instruct the DMA engine to write data, read by the DMA controller, to an accelerator. Further descriptors can be used to move data from an accelerator to DRAM 1230.

In various examples, each of the processors 1248a-1248s can be responsible for managing the data movement for a different accelerator. In some examples, a processor may manage the data movement for more than one accelerator. Similarly, in various examples, each of the processors 1248a-1248s can be assigned to one or more DMA engines 1246a-1246d. In these and other examples, associations between processors 1248a-1248s, accelerators 1202a-1202n, and DMA engines 1246a-1246d are determined by program code being executed by each respective processor.

In the example acceleration engine 1200, the various components can communicate over a chip interconnect 1220. The chip interconnect 1220 primarily includes wiring for routing data between the components of the acceleration engine 1200. In some cases, the chip interconnect 1220 can include a minimal amount of logic, such as multiplexors to control the direction of data, flip-flops for handling clock domain crossings, and timing logic.

Figure 13:
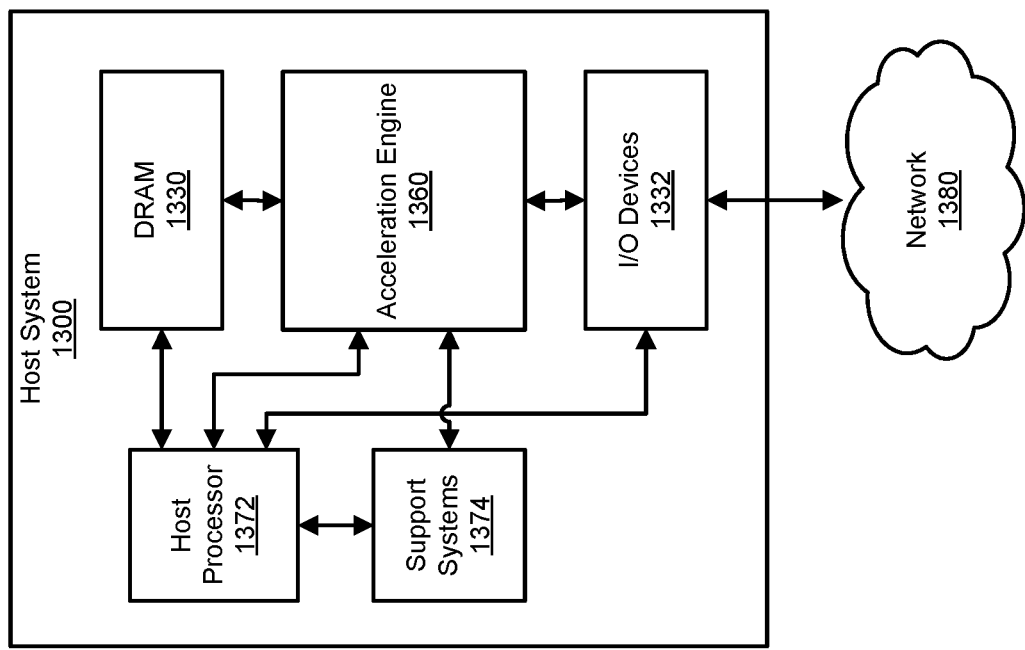
FIG. 13 includes a block diagram of an example of a host system.

FIG. 13 includes a block diagram that illustrates an example of a host system 1300 in which an acceleration engine 1360 can be used. The acceleration engine 1360 of FIG. 13 is an example of a device that can include one or more accelerators such as is illustrated in FIG. 12. The example host system 1300 of FIG. 13 includes the acceleration engine 1360, a host processor 1372, DRAM 1330 or processor memory, I/O devices 1332, and support systems 1374. In various implementations, the host system 1300 can include other hardware that is not illustrated here.

The host processor 1372 is a general purpose integrated circuit that is capable of executing program instructions. In some examples, the host processor 1372 can include multiple processing cores. A multi-core processor may include multiple processing units within the same processor. In some examples, the host system 1300 can include more than one host processor 1372. In some examples, the host processor 1372 and the acceleration engine 1360 can be one chip, such as, one or more integrated circuits within the same package.

In various examples, the host processor 1372 can communicate with other components in the host system 1300 over one or more communication channels. For example, the host system 1300 can include a host processor bus, which the host processor 1372 can use to communicate with the DRAM 1330, for example. As another example, the host system 1300 can include an I/O bus, such as a PCI-based bus, over which the host processor 1372 can communicate with the acceleration engine 1360 and/or the I/O devices 1332, for example. In various examples, the host system 1300 can, alternatively or additionally, include other communication channels or busses, such as serial busses, power management busses, storage device busses, and so on.

In some examples, software programs executing on the host processor 1372 can receive or generate input for processing by the acceleration engine 1360. In some examples, the programs can select an appropriate neural network to execute for a given input. For example, a program may be for language translation, and can select one or more neural networks capable of speech recognition and/or machine translation. In these and other examples, the programs can configure the acceleration engine 1360 with the neural network to execute, and/or can select a neural network processing engine on the acceleration engine 1360 that has previously been configured to execute the desired neural network. In some examples, once the acceleration engine 1360 has started an inference on input data, the host processor 1372 can manage the movement of data (such as weights, instructions, intermediate results, results of conditional layers, and/or final results) into or out of the acceleration engine 1360.

In some examples, a software program that is using the acceleration engine 1360 to conduct an inference can read the result from a conditional layer from the acceleration engine 1360 and/or from a storage location, such as in DRAM 1330. In these examples, the program can determine what action the neural network should take next. For example, the program can determine to terminate the inference. As another example, the program can determine to change the direction of the inference, which can be translated by lower level code and/or the neural network processor to a next layer to execute. In these and other examples, the execution flow of the neural network can be coordinated by software.

The DRAM 1330 is memory that is used by the host processor 1372 for storage of program code that the host processor 1372 is in the process of executing, as well as values that are being operated on. In some examples, the data for a neural network (e.g., weight values, instructions, and other data) can be all or partially stored in the DRAM 1330. DRAM is a common term for processor memory, and though DRAM is volatile memory, processor memory can be volatile and/or non-volatile. Though not illustrated here, the host system 1300 can include other volatile and non-volatile memories for other purposes. For example, the host system 1300 can include a Read-Only Memory (ROM) that stores boot code for booting the host system 1300 at power on, and/or Basic Input/Output System (BIOS) code.

Though not illustrated here, the DRAM 1330 can store instructions for various programs, which can be loaded into and be executed by the host processor 1372. For example, the DRAM 1330 can be storing instructions for an operating system, one or more data stores, one or more application programs, one or more drivers, and/or services for implementing the features disclosed herein.

The operating system can manage and orchestrate the overall operation of the host system 1300, such as scheduling tasks, executing applications, and/or controller peripheral devices, among other operations. In some examples, a host system 1300 may host one or more virtual machines. In these examples, each virtual machine may be configured to execute its own operating system. Examples of operating systems include Unix, Linux, Windows, Mac OS, iOS, Android, and the like. The operating system may, alternatively or additionally, be a proprietary operating system.

The data stores can include permanent or transitory data used and/or operated on by the operating system, application programs, or drivers. Examples of such data include web pages, video data, audio data, images, user data, and so on. The information in the data stores may, in some examples, be provided over the network(s) to user devices. In some cases, the data stores may additionally or alternatively include stored application programs and/or drivers. Alternatively or additionally, the data stores may store standard and/or proprietary software libraries, and/or standard and/or proprietary application user interface (API) libraries. Information stored in the data stores may be machine-readable object code, source code, interpreted code, or intermediate code.

The drivers can include programs that provide communication between components in the host system 1300. For example, some drivers can provide communication between the operating system and peripheral devices or I/O devices 1332. Alternatively or additionally, some drivers may provide communication between application programs and the operating system, and/or application programs and peripheral devices accessible to the host system 1300. In many cases, the drivers can include drivers that provide well-understood functionality (e.g., printer drivers, display drivers, hard disk drivers, Solid State Device drivers, etc.). In other cases, the drivers may provide proprietary or specialized functionality.

The I/O devices 1332 can include hardware for connecting to user input and output devices, such as keyboards, mice, pens, tablets, voice input devices, touch input devices, displays or monitors, speakers, and printers, among other devices. The I/O devices 1332 can also include storage drives and/or network interfaces for connecting to a network 1380. For example, the host system 1300 can use a network interface to communicate with storage devices, user terminals, other computing devices or servers, and/or other networks, among various examples.

In various examples, one or more of the I/O devices 1332 can be storage devices. In these examples, the storage devices include non-volatile memory and can store program instructions and/or data. Examples of storage devices include magnetic storage, optical disks, solid state disks, flash memory, and/or tape storage, among others. The storage device can be housed in the same chassis as the host system 1300 or may be in an external enclosure. A storage device can be fixed (e.g., attached by screws) or removable (e.g., having a physical release mechanism and possibly a hot-plug mechanism).

Storage devices, the DRAM 1330, and any other memory component in the host system 1300 are examples of computer-readable storage media. Computer-readable storage media are physical mediums that are capable of storing data in a format that can be read by a device such as the host processor 1372. Computer-readable storage media can be non-transitory. Non-transitory computer-readable media can retain the data stored thereon when no power is applied to the media. Examples of non-transitory computer-readable media include ROM devices, magnetic disks, magnetic tape, optical disks, flash devices, and solid state drives, among others. As used herein, computer-readable storage media does not include computer-readable communication media.

In various examples, the data stored on computer-readable storage media can include program instructions, data structures, program modules, libraries, other software program components, and/or other data that can be transmitted within a data signal, such as a carrier wave or other transmission. The computer-readable storage media can, additionally or alternatively, include documents, images, video, audio, and other data that can be operated on or manipulated through the use of a software program.

In various examples, one or more of the I/O devices 1332 can be PCI-based devices. In these examples, a PCI-based I/O device includes a PCI interface for communicating with the host system 1300. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device, to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe.

A PCI-based device can include one or more functions. A "function" describes the hardware and/or software of an operation that may be provided by the PCI-based device. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some examples, the PCI-based device can include single-root I/O virtualization (SR-IOV). SR-IOV is an extended capability that may be included in a PCI-based device. SR-IOV allows a physical resource (e.g., a single network interface controller) to appear as multiple virtual resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

In various implementations, the support systems 1374 can include hardware for coordinating the operations of the acceleration engine 1360. For example, the support systems 1374 can include a microprocessor that coordinates the activities of the acceleration engine 1360, including moving data around on the acceleration engine 1360. In this example, the microprocessor can be an integrated circuit that can execute microcode. Microcode is program code that can enable an integrated circuit to have some flexibility in the operations that the integrated circuit can execute, but because the program code uses a limited instruction set, the microprocessor may have more limited capability than the host processor 1372. In some examples, the program executed by the microprocessor is stored on the hardware of microprocessor, or on a non-volatile memory chip in the host system 1300. In some examples, the microprocessor and the acceleration engine 1360 can be on chip, such as one integrated circuit on the same die and in the same package.

In some examples, the support systems 1374 can be responsible for taking instructions from the host processor 1372 when programs executing on the host processor 1372 request the execution of a neural network. For example, the host processor 1372 can provide the support systems 1374 with a set of input data and a task that is to be performed on the set of input data. In this example, the support systems 1374 can identify a neural network that can perform the task, and can program the acceleration engine 1360 to execute the neural network on the set of input data. In some examples, the support systems 1374 only needs to select an appropriate neural network processing engine of the neural network processor. In some examples, the support systems 1374 may need to load the data for the neural network onto the acceleration engine 1360 before the acceleration engine 1360 can start executing the neural network. In these and other examples, the support systems 1374 can further receive the output of executing the neural network, and provide the output back to the host processor 1372.

In some examples, the operations of the support systems 1374 can be handled by the host processor 1372. In these examples, the support systems 1374 may not be needed and can be omitted from the host system 1300.

In various examples, the host system 1300 can include a combination of host systems, processor nodes, storage subsystems, and I/O chassis that represent user devices, service provider computers or third party computers.

User devices can include computing devices to access an application (e.g., a web browser or mobile device application). In some examples, the application may be hosted, managed, and/or provided by a computing resources service or service provider. The application may enable a user to interact with the service provider computer to, for example, access web content (e.g., web pages, music, video, etc.). The user device may be a computing device such as, for example, a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device may be in communication with the service provider computer over one or more networks. Additionally, the user device may be part of the distributed system managed by, controlled by, or otherwise part of the service provider computer (e.g., a console device integrated with the service provider computers).

The host system 1300 can also represent one or more service provider computers. A service provider computer may provide a native application that is configured to run on user devices, which users may interact with. The service provider computer may, in some examples, provide computing resources such as, but not limited to, client entities, low latency data storage, durable data storage, data access, management, virtualization, cloud-based software solutions, electronic content performance management, and so on. The service provider computer may also be operable to provide web hosting, databasing, computer application development and/or implementation platforms, combinations of the foregoing or the like. In some examples, the service provider computer may be provided as one or more virtual machines implemented in a hosted computing environment. The hosted computing environment can include one or more rapidly provisioned and released computing resources. These computing resources can include computing, networking and/or storage devices. A hosted computing environment may also be referred to as a cloud computing environment. The service provider computer may include one or more servers, perhaps arranged in a cluster, as a server farm, or as individual servers not associated with one another, and may host application and/or cloud-based software services. These servers may be configured as part of an integrated, distributed computing environment. In some examples, the service provider computer may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer may communicate with one or more third party computers.

Figure 14:
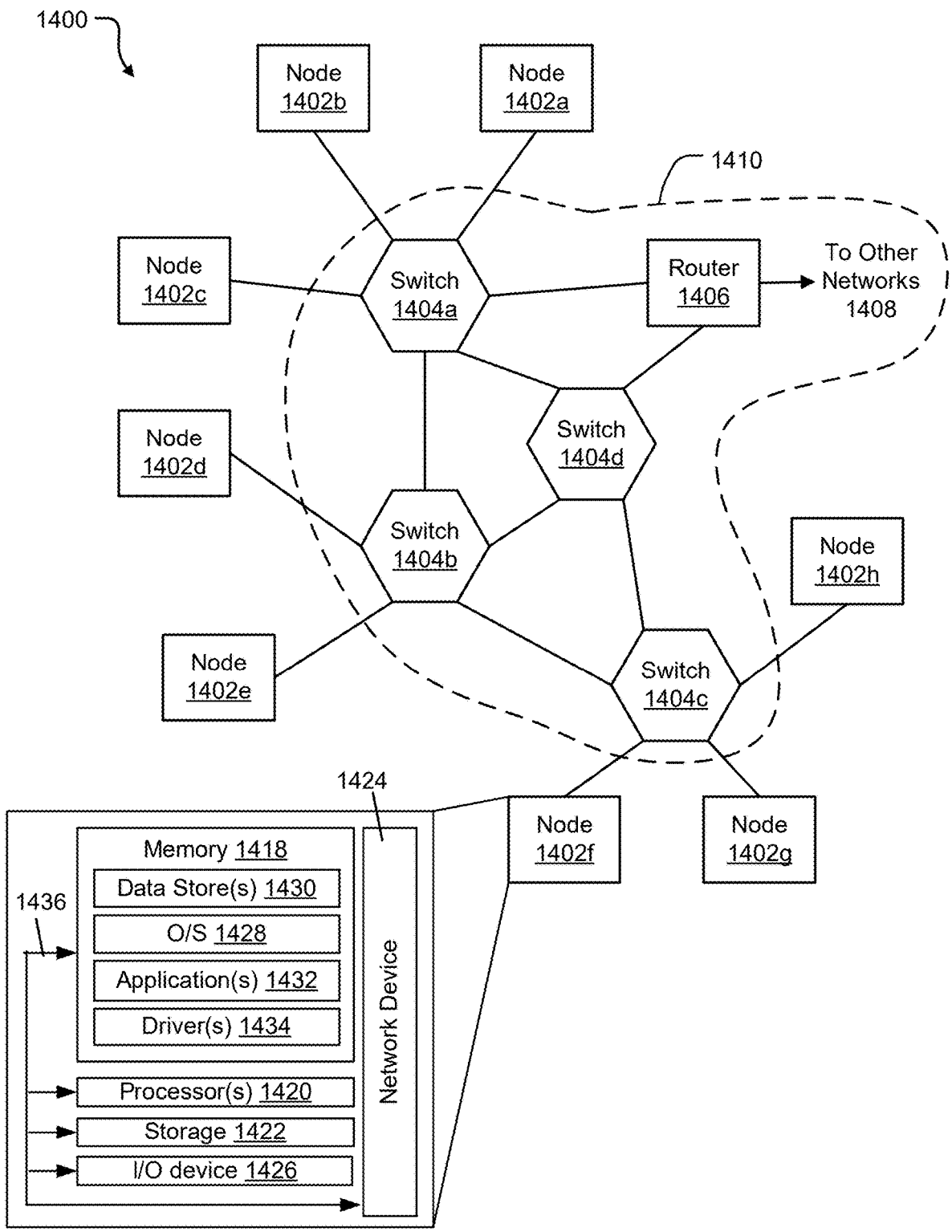
FIG. 14 includes a diagram of an example of a network.

FIG. 14 includes a diagram of an example network 1400, which can include one or more host systems, such as the host system illustrated in FIG. 13. For example, the example network 1400 of FIG. 14 includes multiple nodes 1402a-1402h, one or more of which can be a host system such as is illustrated in FIG. 13. Others of the nodes 1402a-1402h can be other computing devices, each of which include at least a memory for storing program instructions, a processor for executing the instructions, and a network interface for connecting to the network 1400.

In various examples, the network 1400 can be used to process data. For example, input data can be received at one of the nodes 1402a-1402h or from other networks 1408 with which the network 1400 can communicate. In this example, the input data can be directed to a node in the network 1400 that includes an acceleration engine, for the acceleration engine to operate on and produce a result. The result can then be transferred to the node or other network from which the input data was received. In various examples, input data can be accumulated from various sources, including one or more of the nodes 1402a-1402h and/or computing devices located in the other networks 1408, and the accumulated input data can be directed to one or more host systems in the network 1400. Results from the host systems can then be distributed back to the sources from which the input data was gathered.

In various examples, one or more of the nodes 1402a-1402h can be responsible for operations such as accumulating input data for host systems to operate on, keeping track of which host systems are busy and which can accept more work, determining whether the host systems are operating correctly and/or most efficiently, monitoring network security, and/or other management operations.

In the example of FIG. 14, the nodes 1402a-1402h are connected to one another using a switched architecture with point-to point links. The switched architecture includes multiple switches 1404a-1404d, which can be arranged in a multi-layered network such as a Clos network. A network device that filters and forwards packets between local area network (LAN) segments may be referred to as a switch. Switches generally operate at the data link layer (layer 2) and sometimes the network layer (layer 3) of the Open System Interconnect (OSI) Reference Model and may support several packet protocols. The switches 1404a-1404d of FIG. 14 may be connected to the nodes 1402a-1402h and provide multiple paths between any two nodes.

The network 1400 may also include one or more network devices for connection with other networks 1408, such as a router 1406. Routers use headers and forwarding tables to determine the best path for forwarding the packets, and use protocols such as internet control message protocol (ICMP) to communicate with each other and configure the best route between any two devices. The router 1406 of FIG. 14 can be used to connect to other networks 1408 such as subnets, LANs, wide area networks (WANs), and/or the Internet.

In some examples, network 1400 may include any one or a combination of many different types of networks, such as cable networks, the Internet, wireless networks, cellular networks and other private and/or public networks. The interconnected switches 1404a-1404d and the router 1406, if present, may be referred to as a switch fabric 1410, a fabric, a network fabric, or simply a network. In the context of a computer network, terms "fabric" and "network" may be used interchangeably herein.

The nodes 1402a-1402h may be any combination of host systems, processor nodes, storage subsystems, and I/O chassis that represent user devices, service provider computers or third party computers.

User devices may include computing devices to access an application 1432 (e.g., a web browser or mobile device application). In some aspects, the application 1432 may be hosted, managed, and/or provided by a computing resources service or service provider. The application 1432 may allow the user(s) to interact with the service provider computer(s) to, for example, access web content (e.g., web pages, music, video, etc.). The user device(s) may be a computing device such as for example a mobile phone, a smart phone, a personal digital assistant (PDA), a laptop computer, a netbook computer, a desktop computer, a thin-client device, a tablet computer, an electronic book (e-book) reader, a gaming console, etc. In some examples, the user device(s) may be in communication with the service provider computer(s) via the other network(s) 1408. Additionally, the user device(s) may be part of the distributed system managed by, controlled by, or otherwise part of the service provider computer(s) (e.g., a console device integrated with the service provider computers).

The node(s) of FIG. 14 may also represent one or more service provider computers. One or more service provider computers may provide a native application that is configured to run on the user devices, which user(s) may interact with. The service provider computer(s) may, in some examples, provide computing resources such as, but not limited to, client entities, low latency data storage, durable data storage, data access, management, virtualization, cloud-based software solutions, electronic content performance management, and so on. The service provider computer(s) may also be operable to provide web hosting, databasing, computer application development and/or implementation platforms, combinations of the foregoing or the like to the user(s). In some examples, the service provider computer(s) may be provided as one or more virtual machines implemented in a hosted computing environment. The hosted computing environment may include one or more rapidly provisioned and released computing resources. These computing resources may include computing, networking and/or storage devices. A hosted computing environment may also be referred to as a cloud computing environment. The service provider computer(s) may include one or more servers, perhaps arranged in a cluster, as a server farm, or as individual servers not associated with one another and may host the application 1432 and/or cloud-based software services. These servers may be configured as part of an integrated, distributed computing environment. In some aspects, the service provider computer(s) may, additionally or alternatively, include computing devices such as for example a mobile phone, a smart phone, a personal digital assistant (PDA), a laptop computer, a desktop computer, a netbook computer, a server computer, a thin-client device, a tablet computer, a gaming console, etc. In some instances, the service provider computer(s), may communicate with one or more third party computers.

In one example configuration, the node(s) 1402a-1402h may include at least one memory 1418 and one or more processing units (or processor(s) 1420). The processor(s) 1420 may be implemented in hardware, computer-executable instructions, firmware, or combinations thereof. Computer-executable instruction or firmware implementations of the processor(s) 1420 may include computer-executable or machine-executable instructions written in any suitable programming language to perform the various functions described.

In some instances, the hardware processor(s) 1420 may be a single core processor or a multi-core processor. A multi-core processor may include multiple processing units within the same processor. In some examples, the multi-core processors may share certain resources, such as buses and second or third level caches. In some instances, each core in a single or multi-core processor may also include multiple executing logical processors (or executing threads). In such a core (e.g., those with multiple logical processors), several stages of the execution pipeline and also lower level caches may also be shared.

The memory 1418 may store program instructions that are loadable and executable on the processor(s) 1420, as well as data generated during the execution of these programs. Depending on the configuration and type of the node(s) 1402a-1402h, the memory 1418 may be volatile (such as RAM) and/or non-volatile (such as ROM, flash memory, etc.). The memory 1418 may include an operating system 1428, one or more data stores 1430, one or more applications 1432, one or more drivers 1434, and/or services for implementing the features disclosed herein.

The operating system 1428 may support nodes 1402a-1402h basic functions, such as scheduling tasks, executing applications, and/or controller peripheral devices. In some implementations, a service provider computer may host one or more virtual machines. In these implementations, each virtual machine may be configured to execute its own operating system. Examples of operating systems include Unix, Linux, Windows, Mac OS, iOS, Android, and the like. The operating system 1428 may also be a proprietary operating system.

The data stores 1430 may include permanent or transitory data used and/or operated on by the operating system 1428, applications 1432, or drivers 1434. Examples of such data include web pages, video data, audio data, images, user data, and so on. The information in the data stores 1430 may, in some implementations, be provided over the network(s) 1408 to user devices. In some cases, the data stores 1430 may additionally or alternatively include stored application programs and/or drivers. Alternatively or additionally, the data stores 1430 may store standard and/or proprietary software libraries, and/or standard and/or proprietary application user interface (API) libraries. Information stored in the data stores 1430 may be machine-readable object code, source code, interpreted code, or intermediate code.

The drivers 1434 include programs that may provide communication between components in a node. For example, some drivers 1434 may provide communication between the operating system 1428 and additional storage 1422, network device 1424, and/or I/O device 1426. Alternatively or additionally, some drivers 1434 may provide communication between applications 1432 and the operating system 1428, and/or applications 1432 and peripheral devices accessible to the service provider computer. In many cases, the drivers 1434 may include drivers that provide well-understood functionality (e.g., printer drivers, display drivers, hard disk drivers, Solid State Device drivers). In other cases, the drivers 1434 may provide proprietary or specialized functionality.

The service provider computer(s) or servers may also include additional storage 1422, which may include removable storage and/or non-removable storage. The additional storage 1422 may include magnetic storage, optical disks, solid state disks, flash memory, and/or tape storage. The additional storage 1422 may be housed in the same chassis as the node(s) 1402a-1402h or may be in an external enclosure. The memory 1418 and/or additional storage 1422 and their associated computer-readable media may provide non-volatile storage of computer-readable instructions, data structures, program modules, and other data for the computing devices. In some implementations, the memory 1418 may include multiple different types of memory, such as SRAM, DRAM, or ROM.

The memory 1418 and the additional storage 1422, both removable and non-removable, are examples of computer-readable storage media. For example, computer-readable storage media may include volatile or non-volatile, removable or non-removable media implemented in a method or technology for storage of information, the information including, for example, computer-readable instructions, data structures, program modules, or other data. The memory 1418 and the additional storage 1422 are examples of computer storage media. Additional types of computer storage media that may be present in the node(s) 1402a-1402h may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, solid state drives, or some other medium which can be used to store the desired information and which can be accessed by the node(s) 1402a-1402h. Computer-readable media also includes combinations of any of the above media types, including multiple units of one media type.

Alternatively or additionally, computer-readable communication media may include computer-readable instructions, program modules or other data transmitted within a data signal, such as a carrier wave or other transmission. However, as used herein, computer-readable storage media does not include computer-readable communication media.

The node(s) 1402a-1402h may also include I/O device(s) 1426, such as a keyboard, a mouse, a pen, a voice input device, a touch input device, a display, speakers, a printer, and the like. The node(s) 1402a-1402h may also include one or more communication channels 1436. A communication channel 1436 may provide a medium over which the various components of the node(s) 1402a-1402h can communicate. The communication channel or channels 1436 may take the form of a bus, a ring, a switching fabric, or a network.

The node(s) 1402a-1402h may also contain network device(s) 1424 that allow the node(s) 1402a-1402h to communicate with a stored database, another computing device or server, user terminals and/or other devices on the network(s) 1400.

In some implementations, the network device 1424 is a peripheral device, such as a PCI-based device. In these implementations, the network device 1424 includes a PCI interface for communicating with a host device. The term "PCI" or "PCI-based" may be used to describe any protocol in the PCI family of bus protocols, including the original PCI standard, PCI-X, Accelerated Graphics Port (AGP), and PCI-Express (PCIe) or any other improvement or derived protocols that are based on the PCI protocols discussed herein. The PCI-based protocols are standard bus protocols for connecting devices, such as a local peripheral device to a host device. A standard bus protocol is a data transfer protocol for which a specification has been defined and adopted by various manufacturers. Manufacturers ensure that compliant devices are compatible with computing systems implementing the bus protocol, and vice versa. As used herein, PCI-based devices also include devices that communicate using Non-Volatile Memory Express (NVMe). NVMe is a device interface specification for accessing non-volatile storage media attached to a computing system using PCIe. For example, the bus interface module may implement NVMe, and the network device 1424 may be connected to a computing system using a PCIe interface.

A PCI-based device may include one or more functions. A "function" describes operations that may be provided by the network device 1424. Examples of functions include mass storage controllers, network controllers, display controllers, memory controllers, serial bus controllers, wireless controllers, and encryption and decryption controllers, among others. In some cases, a PCI-based device may include more than one function. For example, a PCI-based device may provide a mass storage controller and a network adapter. As another example, a PCI-based device may provide two storage controllers, to control two different storage resources. In some implementations, a PCI-based device may have up to eight functions.

In some implementations, the network device 1424 may include single-root I/O virtualization (SR-IOV). SR-IOV is an extended capability that may be included in a PCI-based device. SR-IOV allows a physical resource (e.g., a single network interface controller) to appear as multiple resources (e.g., sixty-four network interface controllers). Thus, a PCI-based device providing a certain functionality (e.g., a network interface controller) may appear to a device making use of the PCI-based device to be multiple devices providing the same functionality. The functions of an SR-IOV-capable storage adapter device may be classified as physical functions (PFs) or virtual functions (VFs). Physical functions are fully featured functions of the device that can be discovered, managed, and manipulated. Physical functions have configuration resources that can be used to configure or control the storage adapter device. Physical functions include the same configuration address space and memory address space that a non-virtualized device would have. A physical function may have a number of virtual functions associated with it. Virtual functions are similar to physical functions, but are light-weight functions that may generally lack configuration resources, and are generally controlled by the configuration of their underlying physical functions. Each of the physical functions and/or virtual functions may be assigned to a respective thread of execution (such as for example, a virtual machine) running on a host device.

The modules described herein may be software modules, hardware modules or a suitable combination thereof. If the modules are software modules, the modules can be embodied on a non-transitory computer readable medium and processed by a processor in any of the computer systems described herein. It should be noted that the described processes and architectures can be performed either in real-time or in an asynchronous mode prior to any user interaction. The modules may be configured in the manner suggested in the preceding figures, and/or functions described herein can be provided by one or more modules that exist as separate modules and/or module functions described herein can be spread over multiple modules.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

Any of the methods described herein can be implemented as a computer-readable medium or computer program product comprising instructions which, when the program is executed by one or more computers, cause the one or more computers to carry out the steps of the method. Such computer program products can be transmitted, over a wired or wireless network, in a data carrier signal carrying the computer program product.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A computer-implemented method comprising:
receiving a neural network model that includes memory load operations;
estimating a maximal local memory need for implementing the neural network model;
determining that the estimated maximal local memory need is greater than a size of a local memory of a processing engine for implementing the neural network model;
determining a respective arithmetic intensity factor (AIF) for each memory load operation of the memory load operations;
modifying the neural network model by performing, for each memory load operation with the respective AIF greater than a threshold value:
grouping computation operations that use weights loaded into the local memory by the memory load operation into one or more clusters of computation operations; and
providing the memory load operation before each cluster of the one or more clusters of computation operations, wherein the memory load operation provided before each cluster of the one or more clusters of computation operations has a respective AIF greater than the threshold value; and
generating, based on the modified neural network model, instructions for performing the memory load operations and the computation operations.

2. The computer-implemented method of claim 1, wherein the threshold value is an arithmetic intensity factor of a ridge point of a roofline model of the processing engine, and wherein the processing engine includes a processing element array.

3. The computer-implemented method of claim 1, wherein the neural network model includes a batch-N convolutional neural network model, where N is greater than 1.

4. The computer-implemented method of claim 1, wherein grouping the computation operations that use the weights loaded into the local memory by the memory load operation into the one or more clusters of computation operations comprises:
clustering the computation operations based on memory location objects the computation operations write to, wherein each set of computation operations that write to a same memory location object maps to a respective node in an aggregated cluster; and
splitting, based on distances between nodes in the aggregated cluster, the nodes in the aggregated cluster into one or more clusters of nodes representing the one or more clusters of computation operations, wherein a distance between a first node and a second node in the aggregated cluster is equal to a number of computation operations in the neural network model that are between the set of computation operations mapped to the first node and the set of computation operations mapped to the second node.

5. A computer-implemented method comprising:
receiving a neural network model that includes memory load operations;
estimating a maximal local memory need for implementing the neural network model;

determining that the estimated maximal local memory need is greater than a size of a local memory of a processing engine for implementing the neural network model;

selecting, from the memory load operations and based on arithmetic intensity factors (AIFs) of the memory load operations, a memory load operation having an AIF greater than a threshold value;

grouping computation operations associated with data loaded by the selected memory load operation into two or more clusters of computation operations; and modifying the neural network model by providing the selected memory load operation before each cluster of the two or more clusters of computation operations.

6. The computer-implemented method of claim 5, wherein the threshold value is determined based on an arithmetic intensity factor of a ridge point of a roofline model of a processing engine for implementing the neural network model.

7. The computer-implemented method of claim 5, wherein the neural network model includes a batch-N convolutional neural network model, where N is greater than 1.

8. The computer-implemented method of claim 5, further comprising determining the AIF for the selected memory load operation based on a ratio between a number of floating point operations in the computation operations associated with the data loaded by the selected memory load operation and a number of weights in the data loaded by the selected memory load operation.

9. The computer-implemented method of claim 5, wherein the data loaded by the selected memory load operation includes weights or filter tensors loaded into a local memory of a processing engine for implementing the neural network model.

10. The computer-implemented method of claim 5, wherein grouping the computation operations associated with the data loaded by the selected memory load operation into the two or more clusters of computation operations comprises:

clustering the computation operations based on memory location objects that the computation operations write to, wherein each set of computation operations that write to a same memory location object maps to a respective node in an aggregated cluster; and splitting, based on distances between nodes in the aggregated cluster, the nodes in the aggregated cluster into two or more clusters of nodes that represent the two or more clusters of computation operations, respectively, wherein a distance between a first node and a second node in the aggregated cluster is equal to a number of operations between the set of computation operations mapped to the first node and the set of computation operations mapped to the second node in the neural network model.

11. The computer-implemented method of claim 10, wherein splitting the nodes in the aggregated cluster into the two or more clusters of nodes comprises:

splitting an intermediate cluster of nodes in the aggregated cluster into a first candidate cluster of nodes and a second candidate cluster of nodes;

determining that both an AIF associated with the first candidate cluster of nodes and an AIF associated with the second candidate cluster of nodes are greater than the threshold value;

determining a quality of clustering after splitting the intermediate cluster of nodes; and including the first candidate cluster of nodes and the second candidate cluster of nodes in the two or more clusters of nodes based on determining that the quality of clustering after splitting the intermediate cluster of nodes is higher than a quality of clustering before splitting the intermediate cluster of nodes.

12. The computer-implemented method of claim 10, wherein splitting the nodes in the aggregated cluster into the two or more clusters of nodes comprises:

splitting an intermediate cluster of nodes in the aggregated cluster into a first candidate cluster of nodes and a second candidate cluster of nodes;

determining that an AIF associated with the first candidate cluster of nodes or an AIF associated with the second candidate cluster of nodes is lower than the threshold value; and rejecting the splitting of the intermediate cluster of nodes into the first candidate cluster of nodes and the second candidate cluster of nodes.

13. The computer-implemented method of claim 5, further comprising generating, based on the modified neural network model that includes the selected memory load operation before each cluster of the two or more clusters of computation operations, instructions for performing the selected memory load operations and the computation operations.

14. A non-transitory computer readable medium having stored therein instructions that, when executed by one or more processors, cause the one or more processors to execute a compiler, the compiler performing operations including:

receiving a neural network model that includes memory load operations;

estimating a maximal local memory need for implementing the neural network model;

determining that the estimated maximal local memory need is greater than a size of a local memory of a processing engine for implementing the neural network model;

selecting, from the memory load operations and based on arithmetic intensity factors (AIFs) of the memory load operations, a memory load operation having an AIF greater than a threshold value;

grouping computation operations associated with data loaded by the selected memory load operation into two or more clusters of computation operations; and modifying the neural network model by providing the selected memory load operation before each cluster of the two or more clusters of computation operations.

15. The non-transitory computer readable medium of claim 14, wherein the threshold value is determined based on an arithmetic intensity factor of a ridge point of a roofline model of a processing engine for implementing the neural network model.

16. The non-transitory computer readable medium of claim 14, wherein the neural network model includes a batch-N convolutional neural network model, where N is greater than 1.

17. The non-transitory computer readable medium of claim 14, wherein the operations further comprise determining the AIF for the selected memory load operation based on a ratio between a number of floating point operations in the computation operations associated with the data loaded by the selected memory load operation and a number of weights in the data loaded by the selected memory load operation.

18. The non-transitory computer readable medium of claim 14, wherein grouping the computation operations associated with the data loaded by the selected memory load operation into the two or more clusters of computation operations comprises:

clustering the computation operations based on memory location objects the computation operations write to, wherein each set of computation operations that write to a same memory location object maps to a respective node in an aggregated cluster; and splitting, based on distances between nodes in the aggregated cluster, the nodes in the aggregated cluster into two or more clusters of nodes that represent the two or more clusters of computation operations, respectively, wherein a distance between a first node and a second node in the aggregated cluster is equal to a number of operations between the set of computation operations mapped to the first node and the set of computation operations mapped to the second node in the neural network model.

19. The non-transitory computer readable medium of claim 14, wherein the operations further comprise generating, based on the modified neural network model that includes the selected memory load operation before each cluster of the two or more clusters of computation operations, instructions for performing the memory load operations and the computation operations.

* * * * *